(12) United States Patent
Park et al.

(10) Patent No.: US 12,517,324 B2
(45) Date of Patent: Jan. 6, 2026

(54) OPTICAL IMAGING SYSTEM

(71) Applicant: SAMSUNG ELECTRO-MECHANICS CO., LTD., Suwon-si (KR)

(72) Inventors: Il Yong Park, Suwon-si (KR); In Do Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 759 days.

(21) Appl. No.: 17/841,748

(22) Filed: Jun. 16, 2022

(65) Prior Publication Data

US 2023/0194832 A1 Jun. 22, 2023

(30) Foreign Application Priority Data

Dec. 16, 2021 (KR) .................. 10-2021-0181062

(51) Int. Cl.
G02B 9/64 (2006.01)
G02B 13/16 (2006.01)

(52) U.S. Cl.
CPC .............. *G02B 9/64* (2013.01); *G02B 13/16* (2013.01)

(58) Field of Classification Search
CPC .................................. G02B 9/64; G02B 13/16
See application file for complete search history.

(56) References Cited

U.S. PATENT DOCUMENTS

| 9,176,303 | B2 * | 11/2015 | Jo ........................... G02B 9/62 |
| 11,187,874 | B2 | 11/2021 | Fu et al. |
| 2019/0192990 | A1 | 6/2019 | Li |
| 2020/0249437 | A1 | 8/2020 | Hirano |
| 2020/0285028 | A1 * | 9/2020 | Hirano ................. G02B 9/64 |
| 2020/0393652 | A1 | 12/2020 | Kuo |
| 2021/0364746 | A1 * | 11/2021 | Chen .................... G02B 9/64 |
| 2021/0364764 | A1 | 11/2021 | Hirano |
| 2022/0075151 | A1 | 3/2022 | Bian |
| 2022/0075152 | A1 | 3/2022 | Li |
| 2022/0082798 | A1 | 3/2022 | Yang |
| 2022/0137367 | A1 | 5/2022 | Zhou et al. |
| 2022/0196985 | A1 | 6/2022 | Ye et al. |

FOREIGN PATENT DOCUMENTS

| CN | 111766680 A | * | 10/2020 | ......... G02B 13/0045 |
| CN | 111812823 A | | 10/2020 | |
| CN | 111812825 A | * | 10/2020 | ......... G02B 13/0045 |

(Continued)

OTHER PUBLICATIONS

Taiwanese Office Action issued on Jul. 4, 2023, in counterpart Taiwanese Patent Application No. 111123476 (6 pages in English, 7 pages in Chinese).

(Continued)

*Primary Examiner* — Michael H Caley
(74) *Attorney, Agent, or Firm* — NSIP Law

(57) ABSTRACT

An optical imaging system includes: a first lens, a second lens, a third lens, a fourth lens, a fifth lens, a sixth lens, a seventh lens, an eighth lens and a ninth lens, arranged in order from an object side, wherein the first lens and the second lens each have positive refractive power, and 15<v7-v8<25 is satisfied, where v7 indicates an Abbe number of the seventh lens, and v8 indicates an Abbe number of the eighth lens.

27 Claims, 15 Drawing Sheets

(56) References Cited

FOREIGN PATENT DOCUMENTS

| | | | | |
|---|---|---|---|---|
| CN | 111812823 B | * | 11/2020 | ......... G02B 13/0045 |
| CN | 111929835 A | | 11/2020 | |
| CN | 111929836 A | | 11/2020 | |
| CN | 111929836 B | * | 12/2020 | ......... G02B 13/0045 |
| CN | 112014955 B | * | 1/2021 | ......... G02B 13/0045 |
| CN | 112198632 A | * | 1/2021 | ......... G02B 13/0045 |
| CN | 112415718 A | | 2/2021 | |
| CN | 112596208 A | | 4/2021 | |
| CN | 213986988 U | | 8/2021 | |
| CN | 113484977 A | | 10/2021 | |
| CN | 113534416 A | | 10/2021 | |
| TW | I684807 B | * | 2/2020 | |
| TW | I743421 B | | 10/2021 | |

OTHER PUBLICATIONS

Korean Office Action issued on May 16, 2024, in counterpart Korean Patent Application No. 10-2021-0181062 (9 pages in English, 8 pages in Korean).

Taiwanese Office Action Issued on Jan. 14, 2025, in Counterpart Taiwanese Patent Application No. 113114724 (6 Pages in English, 4 Pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2021-0181062 filed on Dec. 16, 2021, in the Korean Intellectual Property Office, the entire disclosure of which is incorporated herein by reference for all purposes.

BACKGROUND

1. Field

The present disclosure relates to an optical imaging system.

2. Description of the Background

A portable terminal may be equipped with a camera module including an optical imaging system including a plurality of lenses to make video calls and capture images.

As the camera module has gradually been integrated with more functions in the portable terminal, there has been increasing demand for a camera module for a mobile terminal having high resolution.

In addition, as portable terminals are getting smaller, and camera modules for portable terminals are also required to be slim, the development of an optical imaging system capable of implementing high resolution while being slimmed is required.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, a seventh lens, an eighth lens, and a ninth lens, arranged in order from an object side, wherein the first lens and the second lens each have positive refractive power, and wherein $15 < v7-v8 < 25$ is satisfied, where v7 indicates an Abbe number of the seventh lens, and v8 indicates an Abbe number of the eighth lens.

$25 < v1-v3 < 45$ may be satisfied, where v1 indicates an Abbe number of the first lens, and v3 indicates an Abbe number of the third lens.

At least one of $25 < v1-v5 < 45$ and $15 < v1-v6 < 25$ may be satisfied, where v5 indicates an Abbe number of the fifth lens, and v6 indicates an Abbe number of the sixth lens.

$|f1/f2| < 1.0$ may be satisfied, where f1 indicates a focal length of the first lens, and f2 indicates a focal length of the second lens.

$0 < f1/f < 1.4$ and $5 < f2/f < 50$ may be satisfied, where f indicates a total focal length of the optical imaging system.

$-5 < f3/f < 0$ may be satisfied, where f3 indicates a focal length of the third lens.

$-2.0 < f2/f3 < 0$ may be satisfied.

At least one of $|f4/f| > 50.0$, $-25 < f5/f < 0$, $|f6/f| > 2.0$, and $f7/f < 5.0$ may be satisfied, where f4 indicates a focal length of the fourth lens, f5 indicates a focal length of the fifth lens, f6 indicates a focal length of the sixth lens, and f7 indicates a focal length of the seventh lens.

$D1/f < 0.1$ may be satisfied, where f indicates the total focal length of the optical imaging system, and D1 indicates a distance on an optical axis between an image-side surface of the first lens and an object-side surface of the second lens.

$D7/f < 0.1$ may be satisfied, where f indicates the total focal length of the optical imaging system, and D7 indicates a distance on an optical axis between an image-side surface of the seventh lens and an object-side surface of the eighth lens.

$TTL/f < 1.2$ and $BFL/f < 0.3$ may be satisfied, where TTL indicates a distance on an optical axis from an object-side surface of the first lens to an imaging plane, and BFL indicates a distance on the optical axis from an image-side surface of the ninth lens to the imaging plane.

$D6-D1-D2 > 0.2$ mm may be satisfied, where D1 indicates the distance on an optical axis between an image-side surface of the first lens and an object-side surface of the second lens, D2 indicates a distance on the optical axis between an image-side surface of the second lens and an object-side surface of the third lens, and D6 indicates a distance on the optical axis between an image-side surface of the sixth lens and an object-side surface of the seventh lens.

$SA11/CT1 > 40°/mm$ may be satisfied, where SA11 indicates a sweep angle of the first lens at an end of an effective diameter of its object-side surface, and CT1 indicates a thickness on an optical axis of the first lens.

$SA92/CT9 > 50°/mm$ may be satisfied, where SA92 indicates a sweep angle of the ninth lens at an end of an effective diameter of its image-side surface, and CT9 indicates a thickness on an optical axis of the ninth lens.

$SAG11/CT1 > 0.7$ may be satisfied, where SAG11 indicates an SAG value of the first lens at the end of the effective diameter of its object-side surface, and CT1 indicates the thickness on an optical axis of the first lens.

The third lens may have negative refractive power, and the fourth lens may have positive or negative refractive power, and $|f3| < |f4|$ may be satisfied, where f3 indicates the focal length of the third lens, and f4 indicates the focal length of the fourth lens.

The third lens may have negative refractive power, the fourth lens may have positive or negative refractive power, the fifth lens may have negative refractive power, the sixth lens may have positive refractive power, the seventh lens may have positive refractive power, the eighth lens may have positive or negative refractive power, and the ninth lens may have negative refractive power.

In another general aspect, an optical imaging system includes a first lens, a second lens, a third lens, a fourth lens, a fifth lens, a sixth lens, a seventh lens, an eighth lens, and a ninth lens, arranged in order from an object side, wherein the first lens and the second lens each have positive refractive power, the seventh lens has an Abbe number different from an Abbe number of the eighth lens, and $0.5 < L7S2/L8S1 < 1.2$ is satisfied, where L7S2 indicates a radius of curvature of an image-side surface of the seventh lens, and L8S1 indicates a radius of curvature of an object-side surface of the eighth lens.

The image-side surface of the seventh lens and the object-side surface of the eighth lens may each have at least one inflection point in a region other than its paraxial region.

The third lens may have negative refractive power, and $|f3|<|f4|$, $25<v1-v3<45$, and $15<v7-v8<25$ may be satisfied, where v1 indicates an Abbe number of the first lens, v3 indicates an Abbe number of the third lens, v7 indicates an Abbe number of the seventh lens, v8 indicates an Abbe number of the eighth lens, f3 indicates a focal length of the third lens, and f4 indicates a focal length of the fourth lens.

In another general aspect, an optical imaging system includes a first lens, a second lens, a third lens, a fourth lens, a fifth lens, a sixth lens, a seventh lens, an eighth lens, and a ninth lens, arranged in order from an object side, wherein the sixth lens and the seventh lens each have positive refractive power, convex object-side surfaces, and concave image-side surfaces.

The fourth lens may have a concave object-side surface and a convex image-side surface, and the eighth lens may have a convex object-side surface and a concave image-side surface.

The first lens and the second lens may each have positive refractive power, and the third lens, the fifth lens, and the ninth lens may each have negative refractive power.

$15<v7-v8<25$ may be satisfied, where v7 indicates an Abbe number of the seventh lens, and v8 indicates an Abbe number of the eighth lens.

The seventh lens may have an Abbe number different from an Abbe number of the eighth lens, and $0.5<L7S2/L8S1<1.2$ may be satisfied, where L7S2 indicates a radius of curvature of an image-side surface of the seventh lens, and L8S1 indicates a radius of curvature of an object-side surface of the eighth lens.

One or more of $|f3|<|f4|$, $25<v1-v5<45$, and $15<v1-v6<25$ are satisfied, where f3 indicates a focal length of the third lens, f4 indicates a focal length of the fourth lens, v1 indicates an Abbe number of the first lens, v5 indicates an Abbe number of the fifth lens, and v6 indicates an Abbe number of the sixth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
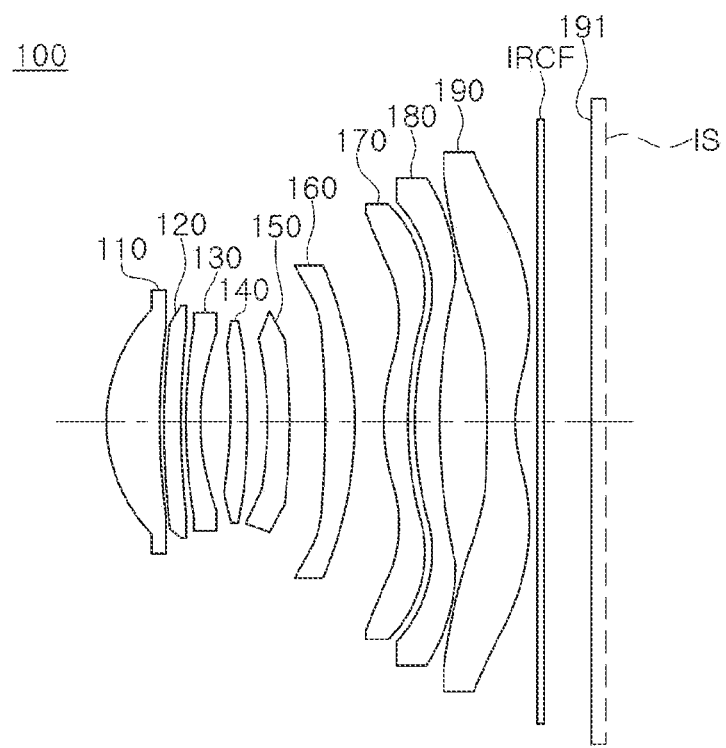
FIG. 1 is a block diagram of an optical imaging system according to a first example embodiment of the present disclosure.

Hereinafter, while example embodiments of the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an optical imaging system having a high resolution.

In the drawings, the thickness, size and shape of a lens are somewhat exaggerated for convenience of explanation. For example, a shape of a spherical surface or an aspherical surface, illustrated in the drawings, is only illustrative. That is, the shape of the spherical surface or the aspherical surface is not limited to that illustrated in the drawings.

An optical imaging system according to an example embodiment of the present disclosure may include nine lenses.

A first lens may indicate a lens disposed closest to an object side, and a ninth lens may indicate a lens disposed closest to an imaging plane (or image sensor).

In addition, a first surface of each lens may indicate its surface closest to the object side (or object-side surface) and a second surface of each lens may indicate its surface closest to an image side (or image-side surface). In addition, all numerical values of the radius of curvature, thickness, distance, focal length, and the like of the lenses may be indicated by millimeters (mm), and a field of view (FOV) may be indicated by degrees.

Further, in a description for a shape of each lens, one surface of a lens, having a convex shape, may indicate that a paraxial region portion of the corresponding surface is convex, and one surface of a lens, having a concave shape, may indicate that a paraxial region portion of the corresponding surface is concave.

Therefore, although it is described that one surface of a lens is convex, an edge portion of the lens may be concave. Likewise, although it is described that one surface of a lens is concave, an edge portion of the lens may be convex.

A paraxial region may indicate a very narrow region in the vicinity of an optical axis and including the optical axis.

The imaging plane may indicate a virtual plane where a focus is formed by the optical imaging system. Alternatively, the imaging plane may indicate one surface of the image sensor, on which light is received.

The optical imaging system according to an example embodiment of the present disclosure may include nine lenses.

For example, the optical imaging system according to an example embodiment of the present disclosure may include a first lens, a second lens, a third lens, a fourth lens, a fifth lens, a sixth lens, a seventh lens, an eighth lens and a ninth lens, arranged in order from the object side. The first lens to the ninth lens may respectively be arranged to be spaced apart from each other by a predetermined distance along the optical axis.

The optical imaging system according to an example embodiment of the present disclosure may further include the image sensor for converting an image of an incident subject into an electrical signal.

In addition, the optical imaging system may further include an infrared filter (hereinafter, filter) blocking an infrared ray. The filter may be disposed between the ninth lens and the image sensor.

In addition, the optical imaging system may further include an aperture for adjusting an amount of light.

The first lens and the second lens may respectively have positive refractive power. Both the first lens and the second lens may have positive refractive power, and thus have sufficient light collecting ability.

Unlike the present disclosure, when the first lens has positive refractive power and the second lens has negative refractive power, the first lens may have very strong positive refractive power. In this case, the first lens may have reduced productivity due to its increased sensitivity.

In addition, a focal length of the first lens may be shorter than a focal length of the second lens. That is, when the first lens has stronger positive refractive power than that of the second lens, the first lens may have the sufficient light collecting ability while reducing sensitivity thereof.

The lenses included in the optical imaging system according to an example embodiment of the present disclosure may each be made of plastic.

In particular, the third to eighth lenses may each be made of plastic having optical characteristics different from those of the lenses disposed adjacent thereto. Therefore, the lenses may appropriately correct chromatic aberration to improve color characteristics.

For example, the third lens and the fifth lens may each be made of plastic having a high refractive index and a low dispersion value. For example, the third lens and the fifth lens may each have a refractive index greater than 1.64, and an Abbe number less than 21.

The fourth lens, the seventh lens and the ninth lens may each be made of plastic having a high dispersion value, and the sixth lens and the eighth lens may each be made of plastic having a medium dispersion value.

The optical imaging system according to an example embodiment of the present disclosure may have an Fno smaller than 2.0, and the optical imaging system may thus be made brighter. In an example embodiment, the optical imaging system may have the Fno greater than or equal to 1.7 and less than 2.0. The Fno may indicate an F-number of the optical imaging system.

The optical imaging system according to an example embodiment of the present disclosure may have the field of view greater than 70°. In an example embodiment, the optical imaging system may have the field of view greater than 70° and smaller than 80°.

All the lenses of the optical imaging system according to an example embodiment of the present disclosure may each have an aspherical surface. For example, the first to ninth lenses may each have at least one aspherical surface.

That is, at least one of the first and second surfaces of the first to ninth lenses may be the aspherical surface. Here, the aspherical surfaces of the first to ninth lenses may be expressed by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}$$

Equation 1

In Equation 1, "c" may indicate a curvature (reciprocal of the radius of curvature) of the lens, "K" may indicate a conic constant, and "Y" may indicate a distance from any point on the aspherical surface of the lens to the optical axis. In addition, each of constants "A" to "H", "J", and "L" to "P" may indicate a coefficient of the aspherical surface. In addition, "Z" may indicate a distance from any point on the aspherical surface of the lens to a vertex of the aspherical surface in an optical axis direction.

In an example embodiment, the optical imaging system may satisfy a condition of 0<f1/f<1.4. Here, "f" may indicate an overall focal length of the optical imaging system, and f1 may indicate the focal length of the first lens. Accordingly, the optical imaging system may have the sufficient light collecting ability.

In an example embodiment, the optical imaging system may satisfy at least one of conditions 25<v1-v3<45, 25<v1-v5<45, 15<v1-v6<25, and 15<v7-v8<25. Here, v1 may indicate an Abbe number of the first lens, v3 may indicate the Abbe number of the third lens, v5 may indicate the Abbe number of the fifth lens, v6 may indicate an Abbe number of the sixth lens, v7 may indicate an Abbe number of the seventh lens, and v8 may indicate an Abbe number of the eighth lens. Therefore, the lens may appropriately correct the chromatic aberration to improve color characteristics.

In an example embodiment, the optical imaging system may satisfy a condition of 5<f2/f<50. Here, f2 may indicate the focal length of the second lens. Accordingly, the second lens may appropriately correct the aberration occurring by the first lens.

In an example embodiment, the optical imaging system may satisfy a condition of −5<f3/f<0. Here, f3 may indicate the focal length of the third lens. Accordingly, the third lens may maintain an appropriate level of the refractive power, thus improving its aberration correction ability.

In an example embodiment, the optical imaging system may satisfy a condition of |f4/f|>50.0. Here, f4 may indicate the focal length of the fourth lens. It may be inferred that the fourth lens has the positive or negative refractive power from an absolute value indicated in the above condition. The fourth lens may have an appropriate level of refractive power to improve aberration correction ability thereof.

In an example embodiment, the optical imaging system may satisfy the condition −25<f5/f<0. Here, f5 may indicate the focal length of the fifth lens. Accordingly, the fifth lens may maintain an appropriate level of the refractive power, thus improving its aberration correction ability.

In an example embodiment, the optical imaging system may satisfy a condition of |f6/f|>2.0. Here, f6 may indicate the focal length of the sixth lens. The sixth lens may thus have an appropriate level of the refractive power to improve its aberration correction ability.

In an example embodiment, the optical imaging system may satisfy a condition of f7/f<5.0. Here, f7 may indicate the focal length of the seventh lens. The seventh lens may thus have an appropriate level of the refractive power to improve its aberration correction ability.

In an example embodiment, the optical imaging system may satisfy a condition of |f1/f2|<1.0. That is, the focal length of the first lens may be shorter than the focal length of the second lens. If the focal length of the second lens is too short (i.e., if the second lens has strong refractive power), it is difficult to improve the aberration.

In an example embodiment, the optical imaging system may satisfy a condition of −2.0<f1/f3<0.0. Accordingly, the first lens and the third lens may each maintain their appropriate levels of the refractive power, thus improving an image quality.

In an example embodiment, the optical imaging system may satisfy a condition of TTL/f<1.2. Here, TTL may indicate a distance from the object-side surface of the first lens to the imaging plane in the optical axis direction. Accordingly, the optical imaging system may be made slim while including the first to ninth lenses.

In an example embodiment, the optical imaging system may satisfy a condition of BFL/f<0.3. Here, BFL may indicate a distance from the image-side surface of the ninth lens to the imaging plane in the optical axis direction. Accordingly, the optical imaging system may be made slim while including the first to ninth lenses.

In an example embodiment, the optical imaging system may satisfy a condition of D1/f<0.1. Here, D1 may indicate a distance between the image-side surface of the first lens and the object-side surface of the second lens in the optical axis direction. Accordingly, it is possible to appropriately correct a longitudinal chromatic aberration in a paraxial region.

In an example embodiment, the optical imaging system may satisfy a condition of D7/f<0.1. Here, D7 may indicate a distance between the image-side surface of the seventh lens and the object-side surface of the eighth lens in the optical axis direction. Accordingly, it is possible to appropriately correct the longitudinal chromatic aberration in the paraxial region.

In an example embodiment, the optical imaging system may satisfy a condition of D6-D1-D2>0.2 mm. Here, D1 may indicate the distance between the image-side surface of the first lens and the object-side surface of the second lens in the optical axis direction, D2 may indicate a distance between the image-side surface of the second lens and the object-side surface of the third lens in the optical axis direction, and D6 may indicate a distance between the image-side surface of the sixth lens and the object-side surface of the seventh lens in the optical axis direction. Accordingly, it is possible to improve the aberration correction ability thereof.

In an example embodiment, the optical imaging system may satisfy a condition of SA11/CT1>40°/mm. Here, SA11 may indicate a sweep angle of the first lens at an end of an effective diameter of its object-side surface, and CT1 may indicate a thickness of the first lens in the optical axis direction. Accordingly, it is possible to improve the aberration correction ability.

In an example embodiment, the optical imaging system may satisfy a condition of SA92/CT9>50°/mm. Here, SA92 may indicate a sweep angle of the ninth lens at an end of an effective diameter of its image-side surface, and CT9 may indicate a thickness of the ninth lens in the optical axis direction. Accordingly, it is possible to improve the aberration correction ability.

Figure 15:
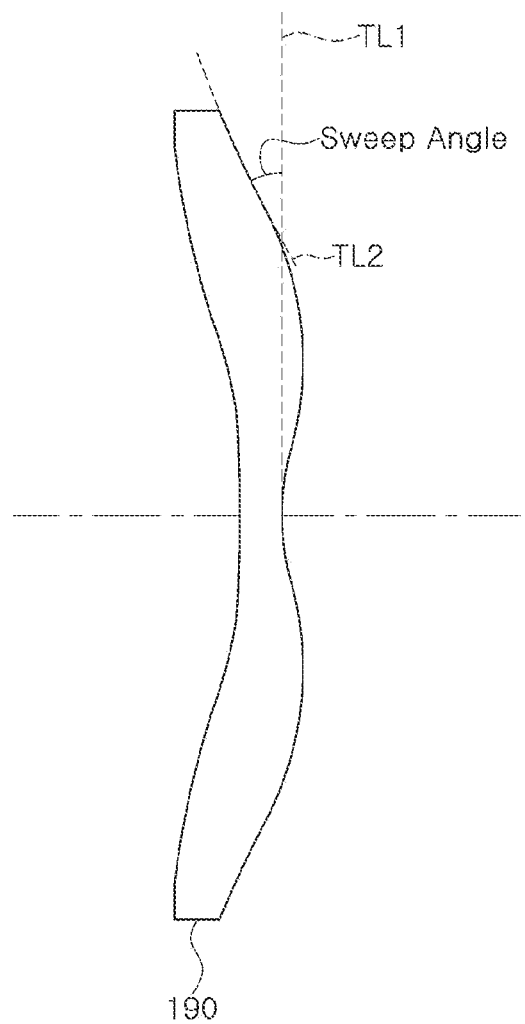
FIG. 15 is a view showing a sweep angle at a specific position on a lens surface.

FIG. 15 shows a sweep angle of the lens at a specific position on its surface. For example, the sweep angle of the ninth lens at the end of the effective diameter of its image-side surface may be defined as an angle formed between a normal TL1 at a vertex of its image-side surface and a normal TL2 at the end of its effective diameter.

When the lens has the convex object-side surface, its sweep angle may have a positive value, and when the lens has the concave object-side surface, its sweep angle may have a negative value.

In addition, when the lens has the convex image-side surface, its sweep angle may have the negative value, and when the lens has the concave image-side surface, its sweep angle may have the positive value.

In an example embodiment, the optical imaging system may satisfy a condition of SAG11/CT1>0.70. Here, SAG11 may indicate an SAG value of the first lens at the end of the effective diameter of its object-side surface. Accordingly, it is possible to improve the aberration correction ability.

When the lens has the convex object-side surface, the SAG value measured at any position on the object-side surface may have the positive value, and when the lens has the concave object-side surface, the SAG value measured at any position on the object-side surface may have the negative value.

In addition, when the lens has the convex image-side surface, the SAG value measured at any position on the image-side surface may have the negative value, and when the lens has the concave image-side surface, the SAG value measured at any position on the image-side surface may have the positive value.

In an example embodiment, the optical imaging system may satisfy a condition of L7S2/L8S1>0. The optical imaging system may satisfy a condition of 0.5<L7S2/L8S1<1.2. Here, L7S2 may indicate a radius of curvature of the image-side surface of the seventh lens, and L8S1 may indicate a radius of curvature of the object-side surface of the eighth lens. Accordingly, the seventh lens and the eighth lens may each maintain their appropriate levels of the refractive power, thus improving image quality.

In an example embodiment, the image-side surface of the seventh lens and the object-side surface of the eighth lens may have similar shapes and be disposed to be disposed close to each other. In addition, a synthetic focal length of the seventh and eighth lenses may have the positive value.

In an example embodiment, the optical imaging system may satisfy a condition of f1>f12. Here, f12 may indicate a synthetic focal length of the first lens and the second lens.

In an example embodiment, the optical imaging system may satisfy a condition of |f3|<|f4|. Here, f3 may indicate the focal length of the third lens, and f4 may indicate the focal length of the fourth lens.

An optical imaging system 100 according to a first example embodiment of the present disclosure is described with reference to FIGS. 1 and 2.

The optical imaging system 100 according to the first example embodiment of the present disclosure may include a first lens 110, a second lens 120, a third lens 130, a fourth lens 140, a fifth lens 150, a sixth lens 160, a seventh lens 170, an eighth lens 180, and a ninth lens 190, and may further include the aperture, a filter IRCF, and an image sensor IS.

The optical imaging system 100 according to the first example embodiment of the present disclosure may form the focus on an imaging plane 191. The imaging plane 191 may indicate a surface on which the focus is formed by the optical imaging system. For example, the imaging plane 191 may indicate one surface of the image sensor IS, on which light is received.

Tables 1 and 2 show characteristics of each lens (e.g., radius of curvature, thickness of the lens or distance between the lenses, refractive index, Abbe number, and focal length).

TABLE 1

| Surface no. | Item | Radius of curvature | Thickness or distance | Refractive index | Abbe no. | Focal length |
|---|---|---|---|---|---|---|
| S1 | First lens | 2.734 | 0.920 | 1.546 | 56.0 | 6.202 |
| S2 | | 12.479 | 0.065 | | | |
| S3 | Second lens | 12.093 | 0.280 | 1.546 | 56.0 | 129.516 |
| S4 | | 14.467 | 0.062 | | | |
| S5 | Third lens | 9.129 | 0.260 | 1.687 | 18.4 | -14.934 |
| S6 | | 4.775 | 0.466 | | | |
| S7 | Fourth lens | -48.000 | 0.325 | 1.546 | 56.0 | -933.596 |
| S8 | | -53.114 | 0.278 | | | |
| S9 | Fifth lens | 50.934 | 0.400 | 1.667 | 20.4 | -51.789 |
| S10 | | 20.518 | 0.587 | | | |

TABLE 1-continued

| Surface no. | Item | Radius of curvature | Thickness or distance | Refractive index | Abbe no. | Focal length |
|---|---|---|---|---|---|---|
| S11 | Sixth lens | 11.504 | 0.500 | 1.570 | 37.4 | 70.584 |
| S12 | | 15.852 | 0.517 | | | |
| S13 | Seventh lens | 3.582 | 0.452 | 1.546 | 56.0 | 8.946 |
| S14 | | 12.821 | 0.092 | | | |
| S15 | Eighth lens | 17.000 | 0.380 | 1.570 | 37.4 | −886.213 |
| S16 | | 16.313 | 0.769 | | | |
| S17 | Ninth lens | 6.016 | 0.503 | 1.546 | 56.0 | −5.912 |
| S18 | | 2.039 | 0.370 | | | |
| S19 | Filter | Infinity | 0.110 | 1.518 | 64.2 | |
| S20 | | Infinity | 0.790 | | | |
| S21 | Imaging plane | Infinity | | | | |

TABLE 2

| | |
|---|---|
| f | 6.897 |
| f12 | 5.915 |
| FOV | 75.1 |
| SAG11 | 0.769 |
| SA11 | 41.6 |
| SA12 | 6.9 |
| SA21 | 8.1 |
| SA22 | 3.4 |
| SA31 | 16.8 |
| SA32 | 28.2 |
| SA41 | 10.3 |
| SA42 | 17 |
| SA51 | 39.7 |
| SA52 | 32.9 |
| SA61 | 36.5 |
| SA62 | 21.5 |
| SA71 | 25.6 |
| SA72 | 46.9 |
| SA81 | 43.9 |
| SA82 | 32.8 |
| SA91 | 19.1 |
| SA92 | 28.2 |

In Table 2, "f" may indicate a total focal length of the optical imaging system, f12 may indicate the synthetic focal length of the first and second lenses, FOV may indicate the field of view of the optical imaging system, and SAG11 may indicate the SAG value obtained at the end of the effective diameter of the object-side surface of the first lens.

In addition, SA11 to SA92 indicate the sweep angles of the respective lenses at the ends of the effective diameters of their object-side surfaces and image-side surfaces in order from the first to ninth lenses. For example, SA11 may indicate the sweep angle of the first lens at the end of the effective diameter of its object-side surface, and SA12 may indicate a sweep angle of the first lens at the end of the effective diameter of its image-side surface.

1.82 is an Fno of the optical imaging system 100 according to the first example embodiment of the present disclosure.

In the first example embodiment of the present disclosure, the first lens 110 may have positive refractive power, and the convex first surface and the concave second surface.

The second lens 120 may have positive refractive power, and the convex first surface and the concave second surface.

The third lens 130 may have negative refractive power, and the convex first surface and the concave second surface.

The fourth lens 140 may have negative refractive power, and the concave first surface and the convex second surface.

The fifth lens 150 may have negative refractive power, and the first surface convex in the paraxial region and the second surface concave in the paraxial region.

In addition, at least one inflection point may be formed in a region other than the paraxial region on at least one of the first and second surfaces of the fifth lens 150. For example, the first surface of the fifth lens 150 may be convex in the paraxial region and concave in the region other than the paraxial region. The second surface of the fifth lens 150 may be concave in the paraxial region and convex in the region other than the paraxial region.

The sixth lens 160 may have positive refractive power, and the first surface convex in the paraxial region and the second surface concave in the paraxial region.

In addition, at least one inflection point may be formed in a region other than the paraxial region on at least one of the first and second surfaces of the sixth lens 160. For example, the first surface of the sixth lens 160 may be convex in the paraxial region and concave in the region other than the paraxial region. The second surface of the sixth lens 160 may be concave in the paraxial region and convex in the region other than the paraxial region.

The seventh lens 170 may have positive refractive power, and the first surface convex in the paraxial region and the second surface concave in the paraxial region.

In addition, at least one inflection point may be formed in a region other than the paraxial region on at least one of the first and second surfaces of the seventh lens 170. For example, the first surface of the sixth lens 170 may be convex in the paraxial region and concave in the region other than the paraxial region. The second surface of the sixth lens 170 may be concave in the paraxial region and convex in the region other than the paraxial region.

The eighth lens 180 may have negative refractive power, and the first surface convex in the paraxial region and the second surface concave in the paraxial region.

In addition, at least one inflection point may be formed in a region other than the paraxial region on at least one of the first and second surfaces of the eighth lens 180. For example, the first surface of the eighth lens 180 may be convex in the paraxial region and concave in the region other than the paraxial region. The second surface of the eighth lens 180 may be concave in the paraxial region and convex in the region other than the paraxial region.

The ninth lens 190 may have negative refractive power, and the first surface convex in the paraxial region and the second surface concave in the paraxial region.

In addition, at least one inflection point may be formed in a region other than the paraxial region on at least one of the first and second surfaces of the ninth lens 190. For example, the first surface of the ninth lens 190 may be convex in the paraxial region and concave in the region other than the paraxial region. The second surface of the ninth lens 190 may be concave in the paraxial region and convex in the region other than the paraxial region.

Meanwhile, each surface of the first lens 110 to the ninth lens 190 may have an aspherical coefficient as illustrated in Table 3. For example, the object-side surfaces and image-side surfaces of the first lens 110 to the ninth lens 190 may all be the aspherical surfaces.

TABLE 3

|  | S1 | S2 | S3 | S4 | S5 | S6 |
|---|---|---|---|---|---|---|
| Conic constant K | −1.0326 | 24.3421 | 24.2242 | 25.2574 | 18.9554 | 2.3100 |
| 4th coefficient A | 2.4410E−03 | −3.5443E−02 | −4.6677E−02 | −5.8967E−02 | −6.4190E−02 | −1.7476E−02 |
| 6th coefficient B | 3.1053E−02 | 1.2150E−01 | 1.7189E−01 | 2.4763E−01 | 2.5472E−01 | −7.8887E−03 |
| 8th coefficient C | −1.3452E−01 | −3.8349E−01 | −5.3083E−01 | −8.1450E−01 | −9.7568E−01 | 2.1642E−01 |
| 10th coefficient D | 3.6208E−01 | 8.3596E−01 | 1.1551E+00 | 1.9429E+00 | 2.7230E+00 | −1.0915E+00 |
| 12th coefficient E | −6.3633E−01 | −1.2490E+00 | −1.7431E+00 | −3.3100E+00 | −5.3540E+00 | 3.2672E+00 |
| 14th coefficient F | 7.6380E−01 | 1.3198E+00 | 1.8649E+00 | 4.0527E+00 | 7.4915E+00 | −6.5148E+00 |
| 16th coefficient G | −6.4474E−01 | −1.0130E+00 | −1.4457E+00 | −3.6075E+00 | −7.5615E+00 | 9.0536E+00 |
| 18th coefficient H | 3.8905E−01 | 5.7331E−01 | 8.2268E−01 | 2.3519E+00 | 5.5511E+00 | −8.9532E+00 |
| 20th coefficient J | −1.6860E−01 | −2.4000E−01 | −3.4433E−01 | −1.1220E+00 | −2.9633E+00 | 6.3386E+00 |
| 22th coefficient L | 5.2051E−02 | 7.3536E−02 | 1.0487E−01 | 3.8707E−01 | 1.1374E+00 | −3.1887E+00 |
| 24th coefficient M | −1.1171E−02 | −1.6043E−02 | −2.2618E−02 | −9.3938E−02 | −3.0557E−01 | 1.1126E+00 |
| 26th coefficient N | 1.5839E−03 | 2.3600E−03 | 3.2738E−03 | 1.5202E−02 | 5.4506E−02 | −2.5593E−01 |
| 28th coefficient O | −1.3335E−04 | −2.0972E−04 | −2.8520E−04 | −1.4718E−03 | −5.7952E−03 | 3.4894E−02 |
| 30th coefficient P | 5.0481E−06 | 8.4982E−06 | 1.1301E−05 | 6.4441E−05 | 2.7779E−04 | −2.1355E−03 |

|  | S7 | S8 | S9 | S10 | S11 | S12 |
|---|---|---|---|---|---|---|
| Conic constant K | 82.7021 | 42.8501 | 5.8806 | −4.3158 | −32.0457 | −83.0221 |
| 4th coefficient A | 9.9813E−03 | −2.8128E−02 | −5.4685E−02 | −3.9563E−02 | −4.2872E−02 | −6.2968E−02 |
| 6th coefficient B | −2.3849E−01 | 8.1781E−02 | 9.4803E−02 | 2.3972E−05 | 1.8417E−02 | 1.3082E−02 |
| 8th coefficient C | 1.2867E+00 | −4.6043E−01 | −3.5301E−01 | 6.5960E−02 | 3.2826E−04 | 1.4738E−02 |
| 10th coefficient D | −4.3816E+00 | 1.6464E+00 | 9.1326E−01 | −2.1373E−01 | −1.1405E−02 | −2.4038E−02 |
| 12th coefficient E | 9.9948E+00 | −3.8693E+00 | −1.6528E+00 | 3.8519E−01 | 1.2238E−02 | 1.9188E−02 |
| 14th coefficient F | −1.5879E+01 | 6.2268E+00 | 2.1410E+00 | −4.5707E−01 | −7.7555E−03 | −1.0015E−02 |
| 16th coefficient G | 1.7995E+01 | −7.0562E+00 | −2.0263E+00 | 3.7703E−01 | 3.3825E−03 | 3.6327E−03 |
| 18th coefficient H | −1.4722E+01 | 5.7201E+00 | 1.4170E+00 | −2.2129E−01 | −1.0576E−03 | −9.3159E−04 |
| 20th coefficient J | 8.7059E+00 | −3.3311E+00 | −7.3261E−01 | 9.3045E−02 | 2.3999E−04 | 1.6924E−04 |
| 22th coefficient L | −3.6822E+00 | 1.3820E+00 | 2.7668E−01 | −2.7824E−02 | −3.9386E−05 | −2.1578E−05 |
| 24th coefficient M | 1.0848E+00 | −3.9857E−01 | −7.4170E−02 | 5.7771E−03 | 4.5706E−06 | 1.8850E−06 |
| 26th coefficient N | −2.1121E−01 | 7.5918E−02 | 1.3353E−02 | −7.9163E−04 | −3.5571E−07 | −1.0733E−07 |
| 28th coefficient O | 2.4400E−02 | −8.5853E−03 | −1.4451E−03 | 6.4379E−05 | 1.6609E−08 | 3.5869E−09 |
| 30th coefficient P | −1.2650E−03 | 4.3644E−04 | 7.0917E−05 | −2.3537E−06 | −3.5018E−10 | −5.3347E−11 |

|  | S13 | S14 | S15 | S16 | S17 | S18 |
|---|---|---|---|---|---|---|
| Conic constant K | −4.3714 | −31.5006 | −32.6222 | 11.9115 | −69.6098 | −6.9418 |
| 4th coefficient A | −1.2461E−03 | 3.3135E−02 | 2.1339E−02 | 1.7467E−02 | −6.7992E−02 | −4.5792E−02 |
| 6th coefficient B | −1.3615E−02 | −1.2894E−02 | 5.5867E−03 | 6.1406E−03 | 2.3111E−02 | 1.5896E−02 |
| 8th coefficient C | 1.1855E−02 | 2.7413E−03 | −1.1823E−02 | −9.3145E−03 | −4.4671E−03 | −4.3620E−03 |
| 10th coefficient D | −7.0739E−03 | −5.1947E−04 | 6.2895E−03 | 4.0879E−03 | 1.6842E−04 | 8.4293E−04 |
| 12th coefficient E | 2.6897E−03 | −5.4274E−06 | −2.0035E−03 | −1.0568E−03 | 1.5746E−04 | −1.0754E−04 |
| 14th coefficient F | −6.8687E−04 | 5.3302E−05 | 4.3581E−04 | 1.8294E−04 | −4.6128E−05 | 6.6955E−06 |

TABLE 3-continued

| | | | | | | |
|---|---|---|---|---|---|---|
| 16th coefficient G | 1.2330E−04 | −1.9509E−05 | −6.7772E−05 | −2.2175E−05 | 6.8275E−06 | 4.1532E−07 |
| 18th coefficient H | −1.5912E−05 | 3.8231E−06 | 7.6909E−06 | 1.9153E−06 | −6.4176E−07 | −1.4313E−07 |
| 20th coefficient J | 1.4834E−06 | −4.7717E−07 | −6.4115E−07 | −1.1823E−07 | 4.0798E−08 | 1.6069E−08 |
| 22th coefficient L | −9.8929E−08 | 3.9807E−08 | 3.8996E−08 | 5.1708E−09 | −1.7825E−09 | −1.0577E−09 |
| 24th coefficient M | 4.5969E−09 | −2.2223E−09 | −1.6886E−09 | −1.5679E−10 | 5.2871E−11 | 4.4095E−11 |
| 26th coefficient N | −1.4120E−10 | 7.9953E−11 | 4.9405E−11 | 3.1615E−12 | −1.0188E−12 | −1.1477E−12 |
| 28th coefficient O | 2.5750E−12 | −1.6793E−12 | −8.7570E−13 | −3.8863E−14 | 1.1517E−14 | 1.7069E−14 |
| 30th coefficient P | −2.1096E−14 | 1.5661E−14 | 7.0957E−15 | 2.2751E−16 | −5.8018E−17 | −1.1095E−16 |

Figure 2:
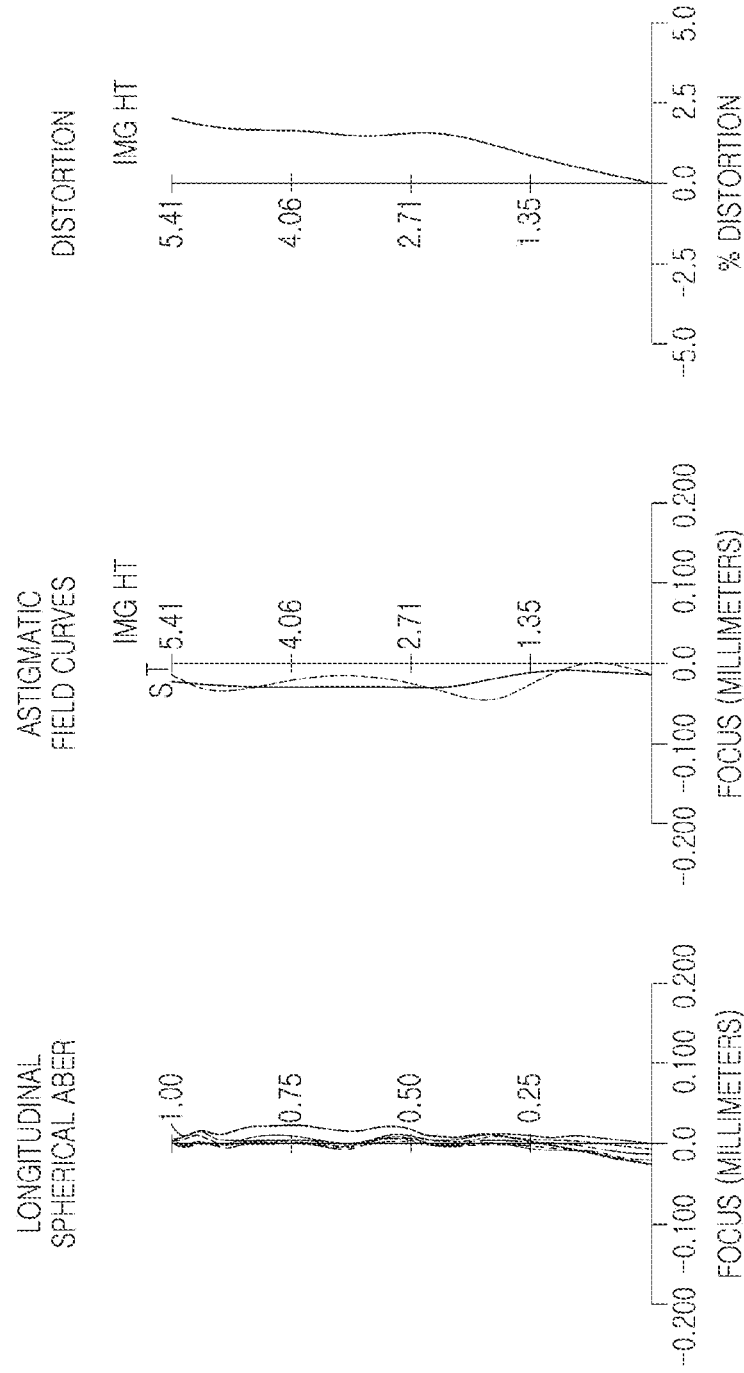
FIG. 2 shows graphs having curves representing aberration characteristics of the optical imaging system illustrated in FIG. 1.

In addition, the optical imaging system configured as described above may have aberration characteristics illustrated in FIG. 2.

Tables 4 and 5 show characteristics of each lens (e.g., radius of curvature, thickness of the lens or distance between the lenses, refractive index, Abbe number, and focal length).

TABLE 4

| Surface no. | Item | Radius of curvature | Thickness or distance | Refractive index | Abbe no. | Focal length |
|---|---|---|---|---|---|---|
| S1 | First lens | 2.736 | 0.913 | 1.546 | 56.0 | 6.263 |
| S2 | | 12.060 | 0.065 | | | |
| S3 | Second lens | 11.750 | 0.296 | 1.546 | 56.0 | 90.480 |
| S4 | | 15.278 | 0.062 | | | |
| S5 | Third lens | 9.526 | 0.240 | 1.677 | 19.2 | −14.189 |
| S6 | | 4.734 | 0.460 | | | |
| S7 | Fourth lens | −108.003 | 0.309 | 1.546 | 56.0 | 639.761 |
| S8 | | −82.587 | 0.271 | | | |
| S9 | Fifth lens | 32.856 | 0.375 | 1.667 | 20.4 | −45.014 |
| S10 | | 15.616 | 0.569 | | | |
| S11 | Sixth lens | 9.574 | 0.498 | 1.570 | 37.4 | 54.246 |
| S12 | | 13.603 | 0.552 | | | |
| S13 | Seventh lens | 3.677 | 0.420 | 1.546 | 56.0 | 8.244 |
| S14 | | 19.242 | 0.090 | | | |
| S15 | Eighth lens | 19.402 | 0.401 | 1.570 | 37.4 | −201.979 |
| S16 | | 16.481 | 0.750 | | | |
| S17 | Ninth lens | 6.114 | 0.490 | 1.546 | 56.0 | −5.734 |
| S18 | | 2.013 | 0.370 | | | |
| S19 | Filter | Infinity | 0.110 | 1.518 | 64.2 | |
| S20 | | Infinity | 0.790 | | | |
| S21 | Imaging plane | Infinity | | | | |

Figure 3:
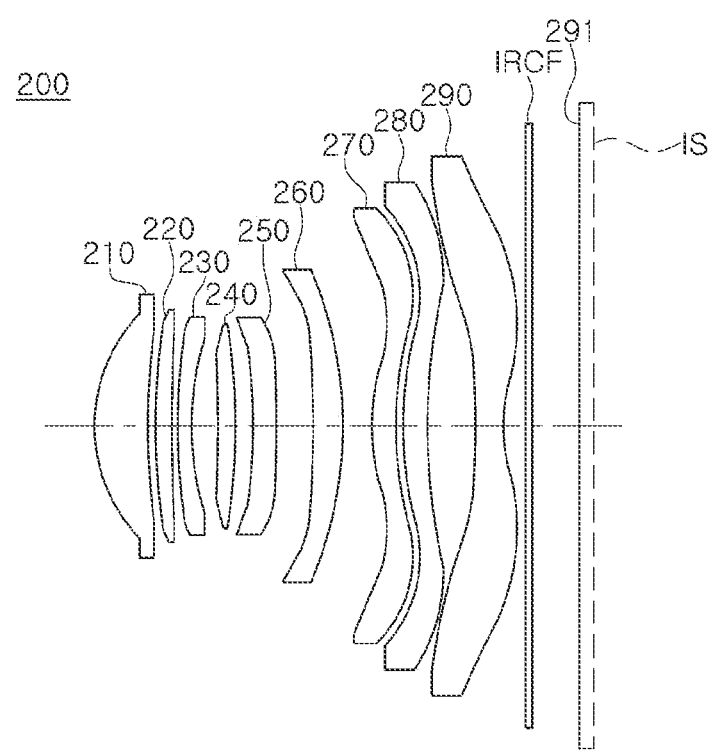
FIG. 3 is a block diagram of an optical imaging system according to a second example embodiment of the present disclosure.

An optical imaging system 200 according to a second example embodiment of the present disclosure is described with reference to FIGS. 3 and 4.

The optical imaging system 200 according to the second example embodiment of the present disclosure may include a first lens 210, a second lens 220, a third lens 230, a fourth lens 240, a fifth lens 250, a sixth lens 260, a seventh lens 270, an eighth lens 280, and a ninth lens 290, and may further include the aperture, the filter IRCF, and the image sensor IS.

The optical imaging system 200 according to the second example embodiment of the present disclosure may form the focus on an imaging plane 291. The imaging plane 291 may indicate the surface on which the focus is formed by the optical imaging system. For example, the imaging plane 291 may indicate one surface of the image sensor IS, on which light is received.

TABLE 5

| | |
|---|---|
| f | 6.779 |
| f12 | 5.869 |
| FOV | 76 |
| SAG11 | 0.77 |
| SA11 | 41.6 |
| SA12 | 6.2 |
| SA21 | 8 |
| SA22 | 2.8 |
| SA31 | 15.4 |
| SA32 | 28.1 |
| SA41 | 9.4 |
| SA42 | 15.8 |
| SA51 | 39.3 |
| SA52 | 32.1 |
| SA61 | 35.8 |
| SA62 | 21.5 |
| SA71 | 26.5 |
| SA72 | 45.8 |

TABLE 5-continued

| | |
|---|---|
| SA81 | 44.1 |
| SA82 | 36.6 |
| SA91 | 19.5 |
| SA92 | 27.9 |

A definition of a parameter illustrated in Table 5 is the same as in the first example embodiment.

1.79 is an Fno of the optical imaging system 200 according to the second example embodiment of the present disclosure.

In the second example embodiment of the present disclosure, the first lens 210 may have positive refractive power, and the convex first surface and the concave second surface.

The second lens 220 may have positive refractive power, and the convex first surface and the concave second surface.

The third lens 230 may have negative refractive power, and the convex first surface and the concave second surface.

The fourth lens 240 may have positive refractive power, and the concave first surface and the convex second surface.

The fifth lens 250 may have negative refractive power, and the first surface convex in the paraxial region and the second surface concave in the paraxial region.

In addition, at least one inflection point may be formed in a region other than the paraxial region on at least one of the first and second surfaces of the fifth lens 250. For example, the first surface of the fifth lens 250 may be convex in the paraxial region and concave in the region other than the paraxial region. The second surface of the fifth lens 250 may be concave in the paraxial region and convex in the region other than the paraxial region.

The sixth lens 260 may have positive refractive power, and the first surface convex in the paraxial region and the second surface concave in the paraxial region.

In addition, at least one inflection point may be formed in a region other than the paraxial region on at least one of the first and second surfaces of the sixth lens 260. For example, the first surface of the sixth lens 260 may be convex in the paraxial region and concave in the region other than the paraxial region. The second surface of the sixth lens 260 may be concave in the paraxial region and convex in the region other than the paraxial region.

The seventh lens 270 may have positive refractive power, and the first surface convex in the paraxial region and the second surface concave in the paraxial region.

In addition, at least one inflection point may be formed in a region other than the paraxial region on at least one of the first and second surfaces of the seventh lens 270. For example, the first surface of the seventh lens 270 may be convex in the paraxial region and concave in the region other than the paraxial region. The second surface of the seventh lens 270 may be concave in the paraxial region and convex in the region other than the paraxial region.

The eighth lens 280 may have negative refractive power, and the first surface convex in the paraxial region and the second surface concave in the paraxial region.

In addition, at least one inflection point may be formed in a region other than the paraxial region on at least one of the first and second surfaces of the eighth lens 280. For example, the first surface of the eighth lens 280 may be convex in the paraxial region and concave in the region other than the paraxial region. The second surface of the eighth lens 280 may be concave in the paraxial region and convex in the region other than the paraxial region.

The ninth lens 290 may have negative refractive power, and the first surface convex in the paraxial region and the second surface concave in the paraxial region.

In addition, at least one inflection point may be formed in a region other than the paraxial region on at least one of the first and second surfaces of the ninth lens 290. For example, the first surface of the ninth lens 290 may be convex in the paraxial region and concave in the region other than the paraxial region. The second surface of the ninth lens 290 may be concave in the paraxial region and convex in the region other than the paraxial region.

Meanwhile, each surface of the first lens 210 to the ninth lens 290 may have an aspherical coefficient as illustrated in Table 6. For example, the object-side surfaces and image-side surfaces of the first lens 210 to the ninth lens 290 may all be the aspherical surfaces.

TABLE 6

| | S1 | S2 | S3 | S4 | S5 | S6 |
|---|---|---|---|---|---|---|
| Conic constant K | −1.0245 | 24.0134 | 24.2773 | 23.5813 | 18.7707 | 2.2857 |
| $4^{th}$ coefficient A | 5.1057E−03 | −3.9804E−02 | −4.9683E−02 | −5.6893E−02 | −6.1480E−02 | −1.4052E−02 |
| $6^{th}$ coefficient B | 1.1882E−02 | 1.5784E−01 | 1.9988E−01 | 2.6147E−01 | 2.5590E−01 | −3.4821E−02 |
| $8^{th}$ coefficient C | −6.2696E−02 | −5.3065E−01 | −6.5238E−01 | −9.6941E−01 | −1.0563E+00 | 3.7165E−01 |
| $10^{th}$ coefficient D | 1.9624E−01 | 1.1930E+00 | 1.4531E+00 | 2.5003E+00 | 3.0386E+00 | −1.7536E+00 |
| $12^{th}$ coefficient E | −3.8023E−01 | −1.8089E+00 | −2.1903E+00 | −4.4116E+00 | −5.9512E+00 | 5.1830E+00 |
| $14^{th}$ coefficient F | 4.8634E−01 | 1.9159E+00 | 2.2941E+00 | 5.4266E+00 | 8.1300E+00 | −1.0261E+01 |
| $16^{th}$ coefficient G | −4.2788E−01 | −1.4581E+00 | −1.7122E+00 | −4.7547E+00 | −7.9216E+00 | 1.4108E+01 |
| $18^{th}$ coefficient H | 2.6511E−01 | 8.1085E−01 | 9.2548E−01 | 3.0089E+00 | 5.5786E+00 | −1.3737E+01 |
| $20^{th}$ coefficient J | −1.1674E−01 | −3.3100E−01 | −3.6411E−01 | −1.3799E+00 | −2.8468E+00 | 9.5367E+00 |
| $22^{th}$ coefficient L | 3.6346E−02 | 9.8299E−02 | 1.0345E−01 | 4.5457E−01 | 1.0426E+00 | −4.6903E+00 |
| $24^{th}$ coefficient M | −7.8239E−03 | −2.0692E−02 | −2.0703E−02 | −1.0484E−01 | −2.6701E−01 | 1.5966E+00 |
| $26^{th}$ coefficient N | 1.1081E−03 | 2.9277E−03 | 2.7716E−03 | 1.6067E−02 | 4.5377E−02 | −3.5774E−01 |
| $28^{th}$ coefficient O | −9.2910E−05 | −2.4976E−04 | −2.2294E−04 | −1.4690E−03 | −4.5942E−03 | 4.7468E−02 |
| $30^{th}$ coefficient P | 3.4951E−06 | 9.7075E−06 | 8.1533E−06 | 6.0596E−05 | 2.0960E−04 | −2.8257E−03 |

TABLE 6-continued

|  | S7 | S8 | S9 | S10 | S11 | S12 |
|---|---|---|---|---|---|---|
| Conic constant K | −94.0701 | 94.7821 | 26.7287 | −10.3246 | −26.8951 | −94.9971 |
| 4th coefficient A | −3.3074E−03 | −3.6137E−02 | −5.5841E−02 | −3.8704E−02 | −4.4171E−02 | −6.2255E−02 |
| 6th coefficient B | −8.4683E−02 | 1.6255E−01 | 1.1686E−01 | −1.3043E−03 | 2.3813E−02 | 1.3104E−02 |
| 8th coefficient C | 4.0123E−01 | −8.1721E−01 | −4.7165E−01 | 6.2322E−02 | −1.3914E−02 | 1.1811E−02 |
| 10th coefficient D | −1.2199E+00 | 2.6167E+00 | 1.3034E+00 | −1.8922E−01 | 1.0949E−02 | −1.9329E−02 |
| 12th coefficient E | 2.4293E+00 | −5.6741E+00 | −2.5302E+00 | 3.2205E−01 | −9.8822E−03 | 1.5187E−02 |
| 14th coefficient F | −3.2654E+00 | 8.6222E+00 | 3.5198E+00 | −3.6275E−01 | 6.8507E−03 | −7.8482E−03 |
| 16th coefficient G | 3.0069E+00 | −9.3708E+00 | −3.5594E+00 | 2.8586E−01 | −3.2915E−03 | 2.8371E−03 |
| 18th coefficient H | −1.8848E+00 | 7.3617E+00 | 2.6344E+00 | −1.6130E−01 | 1.0958E−03 | −7.2846E−04 |
| 20th coefficient J | 7.7224E−01 | −4.1842E+00 | −1.4240E+00 | 6.5554E−02 | −2.5419E−04 | 1.3281E−33304 |
| 22nd coefficient L | −1.8102E−01 | 1.7027E+00 | 5.5490E−01 | −1.9035E−02 | 4.0761E−05 | −1.7012E−05 |
| 24th coefficient M | 1.0031E−02 | −4.8328E−01 | −1.5154E−01 | 3.8520E−03 | −4.4045E−06 | 1.4936E−06 |
| 26th coefficient N | 6.6241E−03 | 9.0820E−02 | 2.7483E−02 | −5.1604E−04 | 3.0425E−07 | −8.5476E−08 |
| 28th coefficient O | −1.7843E−03 | −1.0150E−02 | −2.9689E−03 | 4.1137E−05 | −1.2055E−08 | 2.8707E−09 |
| 30th coefficient P | 1.4758E−04 | 5.1056E−04 | 1.4440E−04 | −1.4778E−06 | 2.0687E−10 | −4.2908E−11 |

|  | S13 | S14 | S15 | S16 | S17 | S18 |
|---|---|---|---|---|---|---|
| Conic constant K | −4.5669 | −26.6451 | −44.4683 | 11.6714 | −86.9396 | −7.0478 |
| 4th coefficient A | −3.2257E−03 | 2.8825E−02 | 2.5617E−02 | 2.4347E−02 | −6.1728E−02 | −4.3662E−02 |
| 6th coefficient B | −8.4083E−03 | −6.9110E−03 | −2.6692E−03 | −3.3064E−03 | 1.6583E−02 | 1.4745E−02 |
| 8th coefficient C | 6.4599E−03 | −1.3811E−03 | −4.6629E−03 | −2.8769E−03 | −9.7047E−04 | −4.3045E−03 |
| 10th coefficient D | −4.0922E−03 | 1.1203E−03 | 2.7361E−03 | 1.5020E−03 | −9.2840E−04 | 1.0467E−03 |
| 12th coefficient E | 1.6555E−03 | −3.8357E−04 | −8.7797E−04 | −4.0840E−04 | 3.7310E−04 | −2.1133E−04 |
| 14th coefficient F | −4.4343E−04 | 9.7548E−05 | 1.9382E−04 | 7.8660E−05 | −7.3779E−05 | 3.3425E−05 |
| 16th coefficient G | 8.2856E−05 | −1.9190E−05 | −3.1149E−05 | −1.1696E−05 | 9.1633E−06 | −3.9225E−06 |
| 18th coefficient H | −1.1086E−05 | 2.8284E−06 | 3.7112E−06 | 1.3708E−06 | −7.6743E−07 | 3.3230E−07 |
| 20th coefficient J | 1.0687E−06 | −3.0393E−07 | −3.2840E−07 | −1.2497E−07 | 4.4473E−08 | −2.0053E−08 |
| 22nd coefficient L | −7.3560E−08 | 2.3287E−08 | 2.1320E−08 | 8.5717E−09 | −1.7862E−09 | 8.5016E−10 |
| 24th coefficient M | 3.5218E−09 | −1.2348E−09 | −9.8577E−10 | −4.2171E−10 | 4.8739E−11 | −2.4693E−11 |
| 26th coefficient N | −1.1130E−10 | 4.2975E−11 | 3.0674E−11 | 1.3901E−11 | −8.5996E−13 | 4.6765E−13 |
| 28th coefficient O | 2.0856E−12 | −8.8195E−13 | −5.7430E−13 | −2.7297E−13 | 8.8169E−15 | −5.2054E−15 |
| 30th coefficient P | −1.7538E−14 | 8.0803E−15 | 4.8751E−15 | 2.4022E−15 | −3.9680E−17 | 2.5873E−17 |

Figure 4:
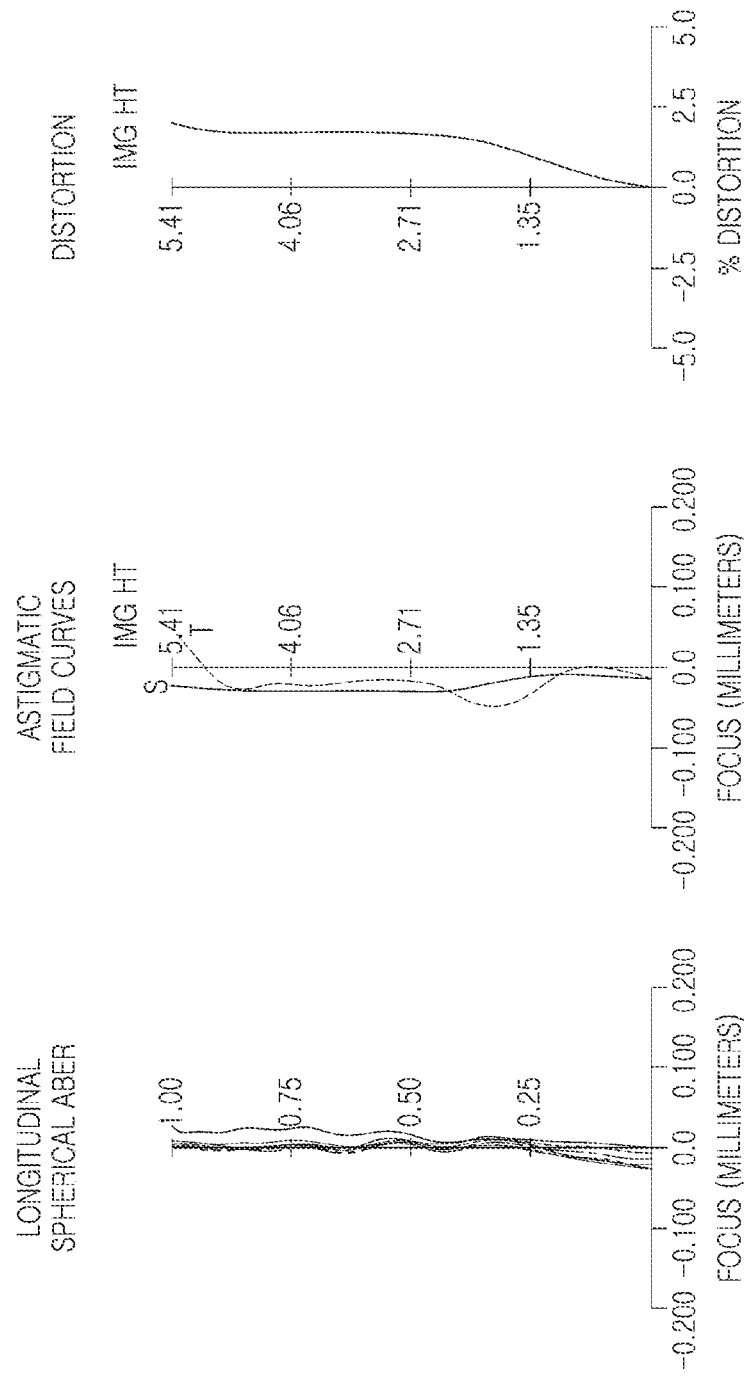
FIG. 4 shows graphs having curves representing aberration characteristics of the optical imaging system illustrated in FIG. 3.

In addition, the optical imaging system configured as described above may have aberration characteristics illustrated in FIG. 4.

Figure 5:
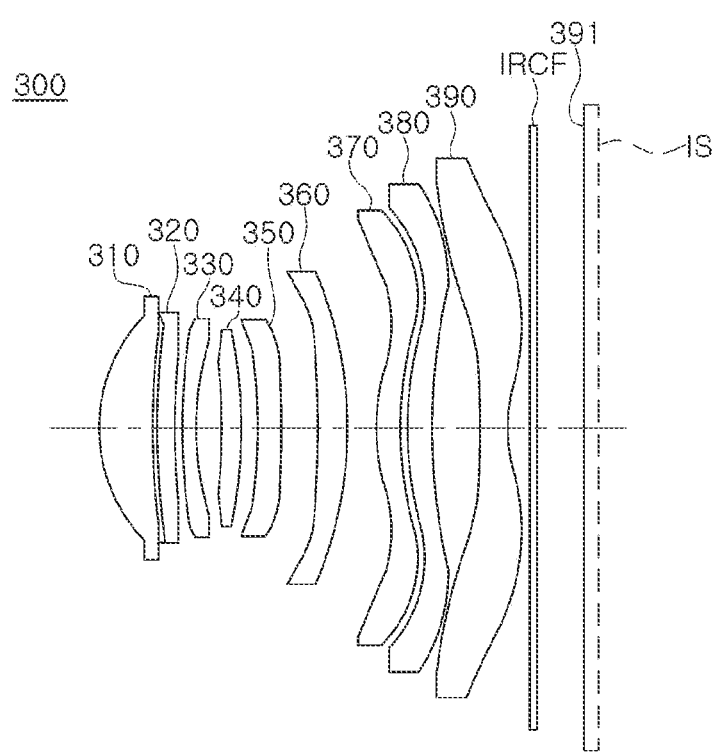
FIG. 5 is a block diagram of an optical imaging system according to a third example embodiment of the present disclosure.

An optical imaging system 300 according to a third example embodiment of the present disclosure is described with reference to FIGS. 5 and 6.

The optical imaging system 300 according to the third example embodiment of the present disclosure may include a first lens 310, a second lens 320, a third lens 330, a fourth lens 340, a fifth lens 350, a sixth lens 360, a seventh lens 370, an eighth lens 380, and a ninth lens 390, and may further include the aperture, the filter IRCF, and the image sensor IS.

The optical imaging system 300 according to the third example embodiment of the present disclosure may form the focus on an imaging plane 391. The imaging plane 391 may indicate the surface on which the focus is formed by the optical imaging system. For example, the imaging plane 391 may indicate one surface of the image sensor IS, on which light is received.

Tables 7 and 8 show characteristics of each lens (e.g., radius of curvature, thickness of the lens or distance between the lenses, refractive index, Abbe number, and focal length).

TABLE 7

| Surface no. | Item | Radius of curvature | Thickness or distance | Refractive index | Abbe no. | Focal length |
|---|---|---|---|---|---|---|
| S1 | First lens | 2.738 | 0.906 | 1.546 | 56.0 | 6.262 |
| S2 |  | 12.118 | 0.067 |  |  |  |

TABLE 7-continued

| Surface no. | Item | Radius of curvature | Thickness or distance | Refractive index | Abbe no. | Focal length |
|---|---|---|---|---|---|---|
| S3 | Second lens | 11.796 | 0.293 | 1.546 | 56.0 | 92.063 |
| S4 | | 15.276 | 0.062 | | | |
| S5 | Third lens | 9.511 | 0.242 | 1.677 | 19.2 | −14.349 |
| S6 | | 4.756 | 0.466 | | | |
| S7 | Fourth lens | −80.000 | 0.318 | 1.546 | 56.0 | −4930.697 |
| S8 | | −82.565 | 0.272 | | | |
| S9 | Fifth lens | 33.797 | 0.377 | 1.667 | 20.4 | −47.527 |
| S10 | | 16.284 | 0.584 | | | |
| S11 | Sixth lens | 9.850 | 0.495 | 1.570 | 37.4 | 59.682 |
| S12 | | 13.607 | 0.541 | | | |
| S13 | Seventh lens | 3.649 | 0.429 | 1.546 | 56.0 | 8.648 |
| S14 | | 15.376 | 0.091 | | | |
| S15 | Eighth lens | 17.000 | 0.401 | 1.570 | 37.4 | −1071.936 |
| S16 | | 16.398 | 0.764 | | | |
| S17 | Ninth lens | 6.093 | 0.493 | 1.546 | 56.0 | −5.796 |
| S18 | | 2.024 | 0.370 | | | |
| S19 | Filter | Infinity | 0.110 | 1.518 | 64.2 | |
| S20 | | Infinity | 0.800 | | | |
| S21 | Imaging plane | Infinity | | | | |

TABLE 8

| | |
|---|---|
| f | 6.85 |
| f12 | 5.874 |
| FOV | 75.5 |
| SAG11 | 0.77 |
| SA11 | 41.7 |
| SA12 | 7 |
| SA21 | 8.5 |
| SA22 | 2.8 |
| SA31 | 15.3 |
| SA32 | 28 |
| SA41 | 9.6 |
| SA42 | 15.9 |
| SA51 | 39.3 |
| SA52 | 32.2 |
| SA61 | 36 |
| SA62 | 21.3 |
| SA71 | 26 |
| SA72 | 46.1 |
| SA81 | 44.4 |
| SA82 | 35.6 |
| SA91 | 19.6 |
| SA92 | 28.2 |

A definition of a parameter illustrated in Table 8 may be the same as in the first example embodiment.

1.81 is an Fno of the optical imaging system 300 according to the third example embodiment of the present disclosure.

In the third example embodiment of the present disclosure, the first lens 310 may have positive refractive power, and the convex first surface and the concave second surface.

The second lens 320 may have positive refractive power, and the convex first surface and the concave second surface.

The third lens 330 may have negative refractive power, and the convex first surface and the concave second surface.

The fourth lens 340 may have negative refractive power, and the concave first surface and the convex second surface.

The fifth lens 350 may have negative refractive power, and the first surface convex in the paraxial region and the second surface concave in the paraxial region.

In addition, at least one inflection point may be formed in a region other than the paraxial region on at least one of the first and second surfaces of the fifth lens 350. For example, the first surface of the fifth lens 350 may be convex in the paraxial region and concave in the region other than the paraxial region. The second surface of the fifth lens 350 may be concave in the paraxial region and convex in the region other than the paraxial region.

The sixth lens 360 may have positive refractive power, and the first surface convex in the paraxial region and the second surface concave in the paraxial region.

In addition, at least one inflection point may be formed in a region other than the paraxial region on at least one of the first and second surfaces of the sixth lens 360. For example, the first surface of the sixth lens 360 may be convex in the paraxial region and concave in the region other than the paraxial region. The second surface of the sixth lens 360 may be concave in the paraxial region and convex in the region other than the paraxial region.

The seventh lens 370 may have positive refractive power, and the first surface convex in the paraxial region and the second surface concave in the paraxial region.

In addition, at least one inflection point may be formed in a region other than the paraxial region on at least one of the first and second surfaces of the seventh lens 370. For example, the first surface of the seventh lens 370 may be convex in the paraxial region and concave in the region other than the paraxial region. The second surface of the seventh lens 370 may be concave in the paraxial region and convex in the region other than the paraxial region.

The eighth lens 380 may have negative refractive power, and the first surface convex in the paraxial region and the second surface concave in the paraxial region.

In addition, at least one inflection point may be formed in a region other than the paraxial region on at least one of the first and second surfaces of the eighth lens 380. For example, the first surface of the eighth lens 380 may be convex in the paraxial region and concave in the region other than the paraxial region. The second surface of the eighth lens 380 may be concave in the paraxial region and convex in the region other than the paraxial region.

The ninth lens 390 may have negative refractive power, and the first surface convex in the paraxial region and the second surface concave in the paraxial region.

In addition, at least one inflection point may be formed in a region other than the paraxial region on at least one of the first and second surfaces of the ninth lens 390. For example, the first surface of the ninth lens 390 may be convex in the paraxial region and concave in the region other than the paraxial region. The second surface of the ninth lens 390 may be concave in the paraxial region and convex in the region other than the paraxial region.

Meanwhile, each surface of the first lens 310 to the ninth lens 390 may have an aspherical coefficient as illustrated in Table 9. For example, the object-side surfaces and image-side surfaces of the first lens 310 to the ninth lens 390 may all be the aspherical surfaces.

TABLE 9

| | S1 | S2 | S3 | S4 | S5 | S6 |
|---|---|---|---|---|---|---|
| Conic constant K | −1.0261 | 24.0358 | 24.2696 | 23.7867 | 18.8140 | 2.2937 |
| $4^{th}$ coefficient A | 3.5273E−03 | −3.7352E−02 | −4.7370E−02 | −5.6639E−02 | −6.2053E−02 | −1.5064E−02 |
| $6^{th}$ coefficient B | 2.3556E−02 | 1.3499E−01 | 1.7674E−01 | 2.5554E−01 | 2.6127E−01 | −2.2176E−02 |
| $8^{th}$ coefficient C | −1.0911E−01 | −4.3648E−01 | −5.5509E−01 | −9.5008E−01 | −1.0931E+00 | 2.9211E−01 |
| $10^{th}$ coefficient D | 3.1064E−01 | 9.6566E−01 | 1.2197E+00 | 2.5036E+00 | 3.1961E+00 | −1.4474E+00 |
| $12^{th}$ coefficient E | −5.6900E−01 | −1.4482E+00 | −1.8250E+00 | −4.5536E+00 | −6.3725E+00 | 4.4090E+00 |
| $14^{th}$ coefficient F | 7.0449E−01 | 1.5151E+00 | 1.8910E+00 | 5.7983E+00 | 8.8685E+00 | −8.9317E+00 |
| $16^{th}$ coefficient G | −6.0902E−01 | −1.1349E+00 | −1.3843E+00 | −5.2706E+00 | −8.8039E+00 | 1.2525E+01 |
| $18^{th}$ coefficient H | 3.7446E−01 | 6.1873E−01 | 7.2429E−01 | 3.4637E+00 | 6.3151E+00 | −1.2422E+01 |
| $20^{th}$ coefficient J | −1.6474E−01 | −2.4671E−01 | −2.7085E−01 | −1.6498E+00 | −3.2806E+00 | 8.7794E+00 |
| $22^{th}$ coefficient L | 5.1487E−02 | 7.1389E−02 | 7.1339E−02 | 5.6408E−01 | 1.2221E+00 | −4.3950E+00 |
| $24^{th}$ coefficient M | −1.1163E−02 | −1.4626E−02 | −1.2785E−02 | −1.3485E−01 | −3.1807E−01 | 1.5227E+00 |
| $26^{th}$ coefficient N | 1.5961E−03 | 2.0155E−03 | 1.4570E−03 | 2.1385E−02 | 5.4875E−02 | −3.4727E−01 |
| $28^{th}$ coefficient O | −1.3535E−04 | −1.6786E−04 | −9.1984E−05 | −2.0192E−03 | −5.6344E−03 | 4.6898E−02 |
| $30^{th}$ coefficient P | 5.1550E−06 | 6.3950E−06 | 2.2641E−06 | 8.5837E−05 | 2.6042E−04 | −2.8413E−03 |

| | S7 | S8 | S9 | S10 | S11 | S12 |
|---|---|---|---|---|---|---|
| Conic constant K | −94.9333 | 94.9207 | 25.1367 | −10.4559 | −28.0517 | −90.4260 |
| $4^{th}$ coefficient A | −6.4041E−04 | −3.3003E−02 | −5.0286E−02 | −3.6111E−02 | −4.2917E−02 | −6.1731E−02 |
| $6^{th}$ coefficient B | −1.1848E−01 | 1.3050E−01 | 6.7929E−02 | −1.9900E−02 | 1.8066E−02 | 1.0382E−02 |
| $8^{th}$ coefficient C | 6.1908E−01 | −6.5755E−01 | −2.4983E−01 | 1.2951E−01 | −1.0780E−03 | 1.7225E−02 |
| $10^{th}$ coefficient D | −2.0863E+00 | 2.1115E+00 | 6.6171E−01 | −3.4274E−01 | −6.1903E−03 | −2.5116E−02 |
| $12^{th}$ coefficient E | 4.7123E+00 | −4.5779E+00 | −1.2617E+00 | 5.6026E−01 | 5.1227E−03 | 1.9175E−02 |
| $14^{th}$ coefficient F | −7.4076E+00 | 6.9373E+00 | 1.7477E+00 | −6.2266E−01 | −2.2023E−03 | −9.7561E−03 |
| $16^{th}$ coefficient G | 8.3060E+00 | −7.5064E+00 | −1.7765E+00 | 4.8921E−01 | 5.7315E−04 | 3.4881E−03 |
| $18^{th}$ coefficient H | −6.7271E+00 | 5.8661E+00 | 1.3311E+00 | −2.7647E−01 | −8.6200E−05 | −8.8802E−04 |
| $20^{th}$ coefficient J | 3.9413E+00 | −3.3157E+00 | −7.3228E−01 | 1.1278E−01 | 5.3489E−06 | 1.6083E−04 |
| $22^{th}$ coefficient L | −1.6530E+00 | 1.3420E+00 | 2.9144E−01 | −3.2899E−02 | 2.3671E−07 | −2.0496E−05 |
| $24^{th}$ coefficient M | 4.8338E−01 | −3.7900E−01 | −8.1454E−02 | 6.6904E−03 | −1.6017E−08 | 1.7921E−06 |
| $26^{th}$ coefficient N | −9.3497E−02 | 7.0906E−02 | 1.5131E−02 | −9.0064E−04 | −8.9000E−09 | −1.0222E−07 |
| $28^{th}$ coefficient O | 1.0738E−02 | −7.8950E−03 | −1.6740E−03 | 7.2116E−05 | 1.1825E−09 | 3.4237E−09 |
| $30^{th}$ coefficient P | −5.5370E−04 | 3.9595E−04 | 8.3330E−05 | −2.6002E−06 | −4.4183E−11 | −5.1052E−11 |

| | S13 | S14 | S15 | S16 | S17 | S18 |
|---|---|---|---|---|---|---|
| Conic constant K | −4.4840 | −4.4840 | −43.8087 | 11.8383 | −84.4472 | −7.0202 |
| $4^{th}$ coefficient A | −3.9789E−04 | −3.9789E−04 | 2.4620E−02 | 2.2025E−02 | −6.4438E−02 | −4.6207E−02 |
| $6^{th}$ coefficient B | −1.5356E−02 | −1.5356E−02 | 7.5862E−05 | 1.4561E−04 | 1.8902E−02 | 1.6573E−02 |
| $8^{th}$ coefficient C | 1.3532E−02 | 1.3532E−02 | −7.4388E−03 | −5.3103E−03 | −2.1174E−03 | −5.0721E−03 |
| $10^{th}$ coefficient D | −8.0102E−03 | −8.0102E−03 | 4.2588E−03 | 2.4698E−03 | −5.8896E−04 | 1.2336E−03 |
| $12^{th}$ coefficient E | 3.0265E−03 | 3.0265E−03 | −1.4035E−03 | −6.4007E−04 | 3.1123E−04 | −2.3537E−04 |
| $14^{th}$ coefficient F | −7.6927E−04 | −7.6927E−04 | 3.1629E−04 | 1.1225E−04 | −6.6722E−05 | 3.3886E−05 |
| $16^{th}$ coefficient G | 1.3745E−04 | 1.3745E−04 | −5.1172E−05 | −1.4269E−05 | 8.6788E−06 | −3.5345E−06 |
| $18^{th}$ coefficient H | −1.7642E−05 | −1.7642E−05 | 6.0524E−06 | 1.3660E−06 | −7.5193E−07 | 2.5879E−07 |
| $20^{th}$ coefficient J | 1.6349E−06 | 1.6349E−06 | −5.2536E−07 | −1.0088E−07 | 4.4832E−08 | −1.2844E−08 |
| $22^{th}$ coefficient L | −1.0835E−07 | −1.0835E−07 | 3.3158E−08 | 5.7762E−09 | −1.8479E−09 | 4.0534E−10 |
| $24^{th}$ coefficient M | 5.0022E−09 | 5.0022E−09 | −1.4823E−09 | −2.4984E−10 | 5.1705E−11 | −6.8373E−12 |

TABLE 9-continued

| | | | | | | |
|---|---|---|---|---|---|---|
| 26th coefficient N | −1.5268E−10 | −1.5268E−10 | 4.4491E−11 | 7.6286E−12 | −9.3594E−13 | 1.3529E−14 |
| 28th coefficient O | 2.7673E−12 | 2.7673E−12 | −8.0387E−13 | −1.4441E−13 | 9.8614E−15 | 1.4568E−15 |
| 30th coefficient P | −2.2540E−14 | −2.2540E−14 | 6.6008E−15 | 1.2564E−15 | −4.5759E−17 | −1.7133E−17 |

Figure 6:
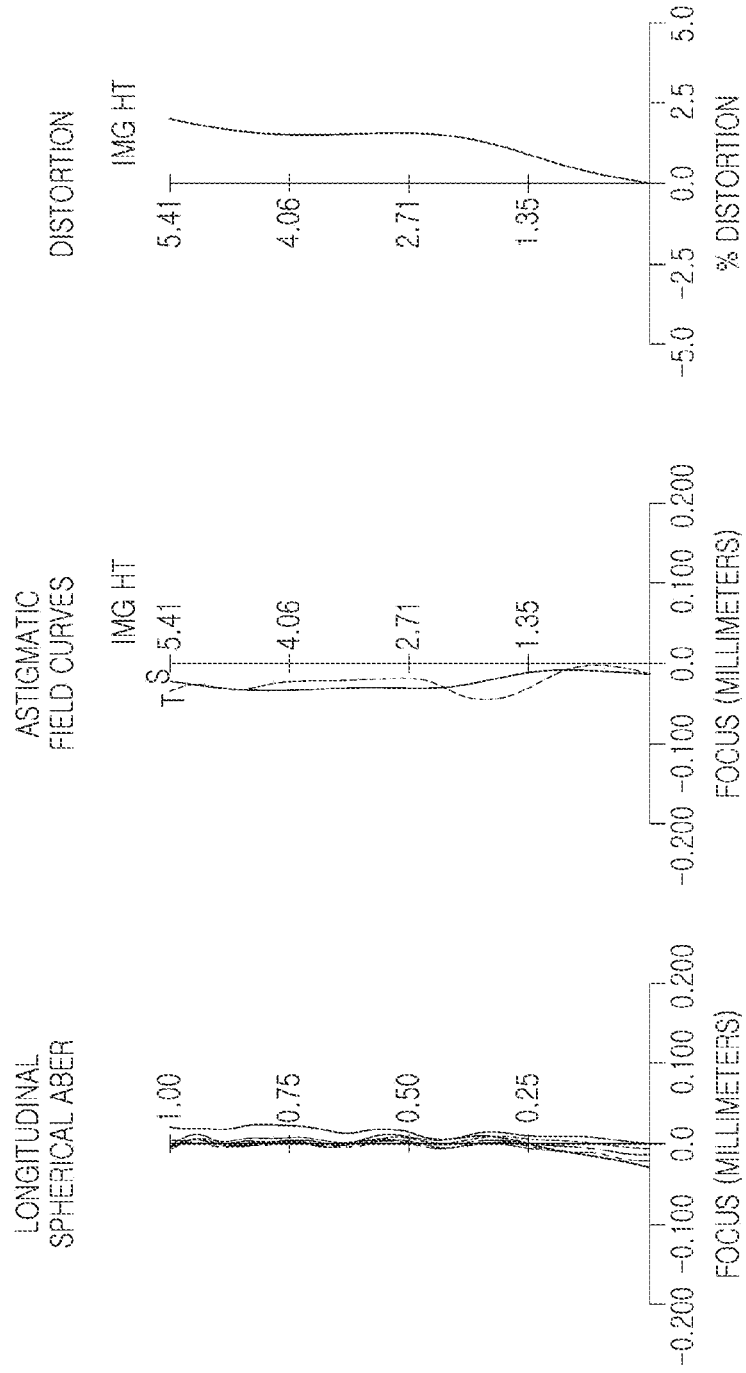
FIG. 6 shows graphs having curves representing aberration characteristics of the optical imaging system illustrated in FIG. 5.

In addition, the optical imaging system configured as described above may have aberration characteristics illustrated in FIG. 6.

Figure 7:
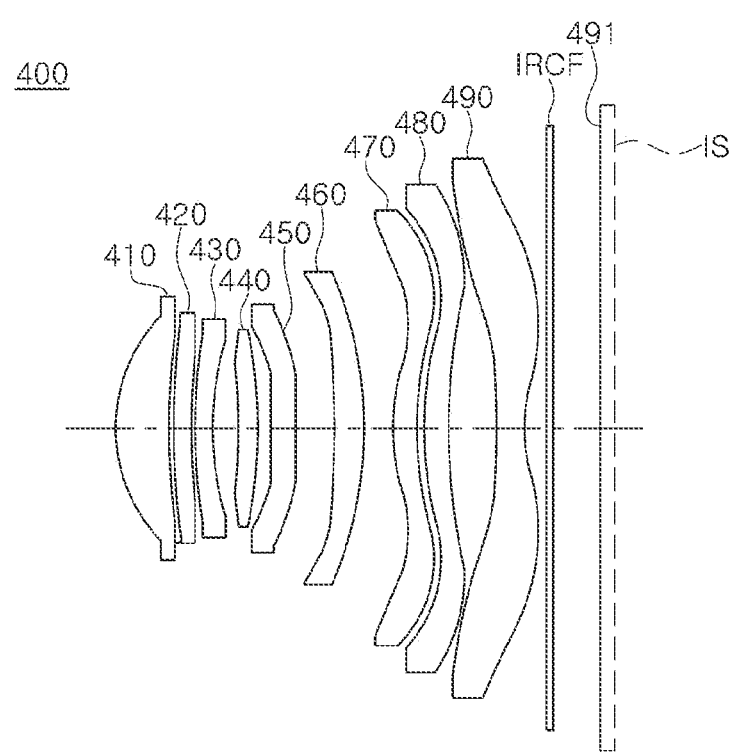
FIG. 7 is a block diagram of an optical imaging system according to a fourth example embodiment of the present disclosure.

An optical imaging system 400 according to a fourth example embodiment of the present disclosure is described with reference to FIGS. 7 and 8.

The optical imaging system 400 according to the fourth example embodiment of the present disclosure may include a first lens 410, a second lens 420, a third lens 430, a fourth lens 440, a fifth lens 450, a sixth lens 460, a seventh lens 470, an eighth lens 480, and a ninth lens 490, and may further include the aperture, the filter IRCF, and the image sensor IS.

The optical imaging system 400 according to the fourth example embodiment of the present disclosure may form the focus on an imaging plane 491. The imaging plane 491 may indicate the surface on which the focus is formed by the optical imaging system. For example, the imaging plane 491 may indicate one surface of the image sensor IS, on which light is received.

Tables 10 and 11 show characteristics of each lens (e.g., radius of curvature, thickness of the lens or distance between the lenses, refractive index, Abbe number, and focal length).

TABLE 10

| Surface no. | Item | Radius of curvature | Thickness or distance | Refractive index | Abbe no. | Focal length |
|---|---|---|---|---|---|---|
| S1 | First lens | 2.736 | 0.904 | 1.546 | 56.0 | 6.261 |
| S2 | | 12.080 | 0.066 | | | |
| S3 | Second lens | 11.749 | 0.293 | 1.546 | 56.0 | 93.827 |
| S4 | | 15.110 | 0.063 | | | |
| S5 | Third lens | 9.422 | 0.242 | 1.677 | 19.2 | −14.353 |
| S6 | | 4.734 | 0.465 | | | |
| S7 | Fourth lens | −68.855 | 0.310 | 1.546 | 56.0 | 721.559 |
| S8 | | −58.708 | 0.274 | | | |
| S9 | Fifth lens | 50.719 | 0.400 | 1.667 | 20.4 | −45.039 |
| S10 | | 18.805 | 0.590 | | | |
| S11 | Sixth lens | 10.245 | 0.492 | 1.570 | 37.4 | 60.013 |
| S12 | | 14.366 | 0.529 | | | |
| S13 | Seventh lens | 3.614 | 0.435 | 1.546 | 56.0 | 8.904 |
| S14 | | 13.462 | 0.101 | | | |
| S15 | Eighth lens | 17.000 | 0.399 | 1.570 | 37.4 | −897.221 |
| S16 | | 16.313 | 0.772 | | | |
| S17 | Ninth lens | 5.898 | 0.501 | 1.546 | 56.0 | −5.869 |
| S18 | | 2.015 | 0.370 | | | |
| S19 | Filter | Infinity | 0.110 | 1.518 | 64.2 | |
| S20 | | Infinity | 0.792 | | | |
| S21 | Imaging plane | Infinity | | | | |

TABLE 11

| | |
|---|---|
| f | 6.878 |
| f12 | 5.879 |
| FOV | 75.2 |

TABLE 11-continued

| | |
|---|---|
| SAG11 | 0.77 |
| SA11 | 41.8 |
| SA12 | 7.6 |
| SA21 | 8.8 |
| SA22 | 3 |
| SA31 | 15.9 |
| SA32 | 28.1 |
| SA41 | 9.7 |
| SA42 | 16.7 |
| SA51 | 39.6 |
| SA52 | 32.8 |
| SA61 | 36.2 |
| SA62 | 21.3 |
| SA71 | 25.8 |
| SA72 | 46.6 |
| SA81 | 44.5 |
| SA82 | 34.1 |
| SA91 | 19.4 |
| SA92 | 28.1 |

A definition of a parameter illustrated in Table 11 may be the same as in the first example embodiment.

1.83 is an Fno of the optical imaging system 400 according to the fourth example embodiment of the present disclosure.

In the fourth example embodiment of the present disclosure, the first lens 410 may have positive refractive power, and the convex first surface and the concave second surface.

The second lens 420 may have positive refractive power, and the convex first surface and the concave second surface.

The third lens 430 may have negative refractive power, and the convex first surface and the concave second surface.

The fourth lens 440 may have positive refractive power, and the concave first surface and the convex second surface.

The fifth lens 450 may have negative refractive power, and the first surface convex in the paraxial region and the second surface concave in the paraxial region.

In addition, at least one inflection point may be formed in a region other than the paraxial region on at least one of the first and second surfaces of the fifth lens 450. For example, the first surface of the fifth lens 450 may be convex in the paraxial region and concave in the region other than the paraxial region. The second surface of the fifth lens 450 may be concave in the paraxial region and convex in the region other than the paraxial region.

The sixth lens 460 may have positive refractive power, and the first surface convex in the paraxial region and the second surface concave in the paraxial region.

In addition, at least one inflection point may be formed in a region other than the paraxial region on at least one of the first and second surfaces of the sixth lens 460. For example, the first surface of the sixth lens 460 may be convex in the paraxial region and concave in the region other than the paraxial region. The second surface of the sixth lens 460 may be concave in the paraxial region and convex in the region other than the paraxial region.

The seventh lens 470 may have positive refractive power, and the first surface convex in the paraxial region and the second surface concave in the paraxial region.

In addition, at least one inflection point may be formed in a region other than the paraxial region on at least one of the first and second surfaces of the seventh lens 470. For example, the first surface of the seventh lens 470 may be convex in the paraxial region and concave in the region other than the paraxial region. The second surface of the seventh lens 470 may be concave in the paraxial region and convex in the region other than the paraxial region.

The eighth lens 480 may have negative refractive power, and the first surface convex in the paraxial region and the second surface concave in the paraxial region.

In addition, at least one inflection point may be formed in a region other than the paraxial region on at least one of the first and second surfaces of the eighth lens 480. For example, the first surface of the eighth lens 480 may be convex in the paraxial region and concave in the region other than the paraxial region. The second surface of the eighth lens 480 may be concave in the paraxial region and convex in the region other than the paraxial region.

The ninth lens 490 may have negative refractive power, and the first surface convex in the paraxial region and the second surface concave in the paraxial region.

In addition, at least one inflection point may be formed in a region other than the paraxial region on at least one of the first and second surfaces of the ninth lens 490. For example, the first surface of the ninth lens 490 may be convex in the paraxial region and concave in the region other than the paraxial region. The second surface of the ninth lens 490 may be concave in the paraxial region and convex in the region other than the paraxial region.

Meanwhile, each surface of the first lens 410 to the ninth lens 490 may have an aspherical coefficient as illustrated in Table 12. For example, the object-side surfaces and image-side surfaces of the first lens 410 to the ninth lens 490 may all be the aspherical surfaces.

TABLE 12

|  | S1 | S2 | S3 | S4 | S5 | S6 |
|---|---|---|---|---|---|---|
| Conic constant K | −1.0262 | 23.9968 | 24.1656 | 24.0710 | 18.8908 | 2.2980 |
| $4^{th}$ coefficient A | 3.1733E−03 | −3.7509E−02 | −4.6982E−02 | −5.5187E−02 | −6.0381E−02 | −1.3740E−02 |
| $6^{th}$ coefficient B | 2.5836E−02 | 1.3285E−01 | 1.6979E−01 | 2.2870E−01 | 2.3011E−01 | −4.2895E−02 |
| $8^{th}$ coefficient C | −1.1583E−01 | −4.1698E−01 | −5.0926E−01 | −7.8043E−01 | −9.0417E−01 | 4.1216E−01 |
| $10^{th}$ coefficient D | 3.2161E−01 | 9.0276E−01 | 1.0756E+00 | 1.9469E+00 | 2.5915E+00 | −1.8327E+00 |
| $12^{th}$ coefficient E | −5.7865E−01 | −1.3391E+00 | −1.5644E+00 | −3.4400E+00 | −5.1796E+00 | 5.1999E+00 |
| $14^{th}$ coefficient F | 7.0716E−01 | 1.3997E+00 | 1.5925E+00 | 4.3259E+00 | 7.3102E+00 | −1.0049E+01 |
| $16^{th}$ coefficient G | −6.0544E−01 | −1.0569E+00 | −1.1565E+00 | −3.9249E+00 | −7.4075E+00 | 1.3662E+01 |
| $18^{th}$ coefficient H | 3.6957E−01 | 5.8531E−01 | 6.0610E−01 | 2.5938E+00 | 5.4447E+00 | −1.3286E+01 |
| $20^{th}$ coefficient J | −1.6171E−01 | −2.3857E−01 | −2.2937E−01 | −1.2492E+00 | −2.9055E+00 | 9.2813E+00 |
| $22^{th}$ coefficient L | 5.0345E−02 | 7.0899E−02 | 6.1876E−02 | 4.3359E−01 | 1.1136E+00 | −4.6187E+00 |
| $24^{th}$ coefficient M | −1.0886E−02 | −1.4964E−02 | −1.1532E−02 | −1.0554E−01 | −2.9847E−01 | 1.5974E+00 |
| $26^{th}$ coefficient N | 1.5540E−03 | 2.1270E−03 | 1.3974E−03 | 1.7075E−02 | 5.3062E−02 | −3.6484E−01 |
| $28^{th}$ coefficient O | −1.3167E−04 | −1.8268E−04 | −9.7558E−05 | −1.6472E−03 | −5.6167E−03 | 4.9458E−02 |
| $30^{th}$ coefficient P | 5.0149E−06 | 7.1653E−06 | 2.8995E−06 | 7.1607E−05 | 2.6772E−04 | −3.0132E−03 |

|  | S7 | S8 | S9 | S10 | S11 | S12 |
|---|---|---|---|---|---|---|
| Conic constant K | −94.9530 | 94.9983 | 24.0590 | −8.4366 | −29.5969 | −85.9421 |
| $4^{th}$ coefficient A | 6.4629E−04 | −2.8643E−02 | −5.1567E−02 | −3.9980E−02 | −4.3786E−02 | −6.3611E−02 |
| $6^{th}$ coefficient B | −1.3243E−01 | 8.7551E−02 | 7.6859E−02 | 6.5019E−03 | 2.3434E−02 | 1.6891E−02 |
| $8^{th}$ coefficient C | 6.8170E−01 | −4.5513E−01 | −2.9234E−01 | 3.2143E−02 | −1.2010E−02 | 7.3425E−03 |
| $10^{th}$ coefficient D | −2.2469E+00 | 1.5180E+00 | 7.8933E−01 | −1.1944E−01 | 6.0085E−03 | −1.6323E−02 |
| $12^{th}$ coefficient E | 4.9716E+00 | −3.4000E+00 | −1.5094E+00 | 2.1950E−01 | −3.4973E−03 | 1.4113E−02 |
| $14^{th}$ coefficient F | −7.6714E+00 | 5.2941E+00 | 2.0753E+00 | −2.6068E−01 | 1.8930E−03 | −7.7676E−03 |
| $16^{th}$ coefficient G | 8.4553E+00 | −5.8618E+00 | −2.0822E+00 | 2.1437E−01 | −7.6924E−04 | 2.9383E−03 |
| $18^{th}$ coefficient H | −6.7375E+00 | 4.6740E+00 | 1.5356E+00 | −1.2539E−01 | 2.1796E−04 | −7.7928E−04 |
| $20^{th}$ coefficient J | 3.8859E+00 | −2.6901E+00 | −8.3074E−01 | 5.2581E−02 | −4.1083E−05 | 1.4538E−04 |
| $22^{th}$ coefficient L | −1.6048E+00 | 1.1071E+00 | 3.2524E−01 | −1.5698E−02 | 4.6508E−06 | −1.8931E−05 |
| $24^{th}$ coefficient M | 4.6210E−01 | −3.1759E−01 | −8.9525E−02 | 3.2584E−03 | −2.1333E−07 | 1.6819E−06 |
| $26^{th}$ coefficient N | −8.7981E−02 | 6.0312E−02 | 1.6404E−02 | −4.4698E−04 | −1.3474E−08 | −9.7089E−08 |
| $28^{th}$ coefficient O | 9.9391E−03 | −6.8130E−03 | −1.7935E−03 | 3.6448E−05 | 2.1196E−09 | 3.2815E−09 |
| $30^{th}$ coefficient P | −5.0356E−04 | 3.4651E−04 | 8.8379E−05 | −1.3384E−06 | −7.5357E−11 | −4.9274E−11 |

TABLE 12-continued

|  | S13 | S14 | S15 | S16 | S17 | S18 |
|---|---|---|---|---|---|---|
| Conic constant K | −4.3972 | −34.2590 | −41.5240 | 11.8947 | −78.8490 | −6.9928 |
| 4th coefficient A | −1.2615E−03 | 3.1729E−02 | 2.2537E−02 | 1.9336E−02 | −6.5175E−02 | −4.6283E−02 |
| 6th coefficient B | −1.3072E−02 | −1.0923E−02 | 4.2700E−03 | 4.0691E−03 | 2.0173E−02 | 1.6971E−02 |
| 8th coefficient C | 1.1117E−02 | 1.1724E−03 | −1.1114E−02 | −8.1301E−03 | −2.9348E−03 | −5.3368E−03 |
| 10th coefficient D | −6.6042E−03 | 2.9113E−04 | 6.0795E−03 | 3.6720E−03 | −3.1139E−04 | 1.3145E−03 |
| 12th coefficient E | 2.5101E−03 | −2.8258E−04 | −1.9749E−03 | −9.6770E−04 | 2.5507E−04 | −2.4743E−04 |
| 14th coefficient F | −6.4136E−04 | 1.1804E−04 | 4.3707E−04 | 1.7212E−04 | −5.9633E−05 | 3.4236E−05 |
| 16th coefficient G | 1.1529E−04 | −3.0089E−05 | −6.8954E−05 | −2.1774E−05 | 8.1302E−06 | −3.3457E−06 |
| 18th coefficient H | −1.4908E−05 | 5.0453E−06 | 7.9088E−06 | 2.0093E−06 | −7.3012E−07 | 2.2128E−07 |
| 20th coefficient J | 1.3933E−06 | −5.7643E−07 | −6.6339E−07 | −1.3703E−07 | 4.4979E−08 | −9.1630E−09 |
| 22nd coefficient L | −9.3178E−08 | 4.5340E−08 | 4.0404E−08 | 6.9280E−09 | −1.9168E−09 | 1.8223E−10 |
| 24th coefficient M | 4.3417E−09 | −2.4229E−09 | −1.7442E−09 | −2.5641E−10 | 5.5620E−11 | 1.8734E−12 |
| 26th coefficient N | −1.3372E−10 | 8.4164E−11 | 5.0681E−11 | 6.6570E−12 | −1.0496E−12 | −2.0075E−13 |
| 28th coefficient O | 2.4447E−12 | −1.7159E−12 | −8.8985E−13 | −1.0901E−13 | 1.1616E−14 | 4.4890E−15 |
| 30th coefficient P | −2.0075E−14 | 1.5588E−14 | 7.1327E−15 | 8.4526E−16 | −5.7216E−17 | −3.5996E−17 |

Figure 8:
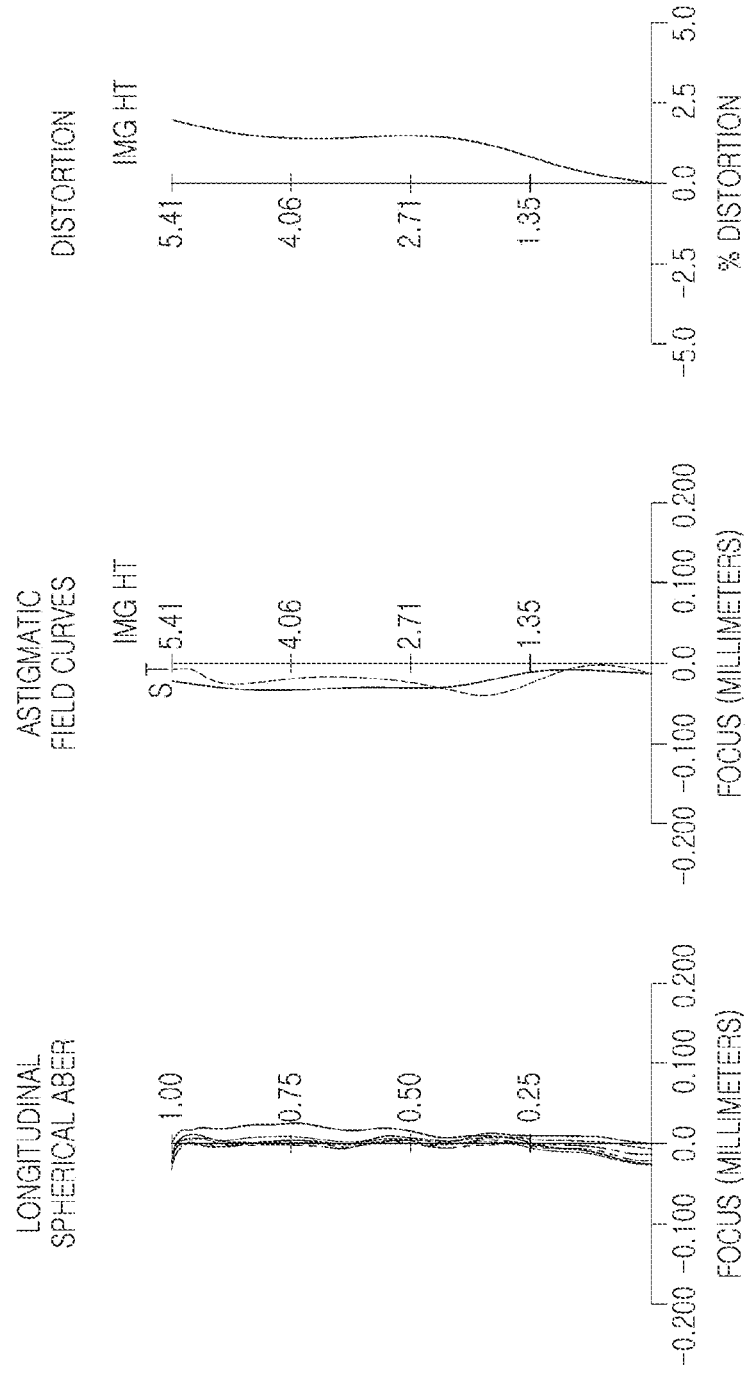
FIG. 8 shows graphs having curves representing aberration characteristics of the optical imaging system illustrated in FIG. 7.

In addition, the optical imaging system configured as described above may have aberration characteristics illustrated in FIG. 8.

Figure 9:
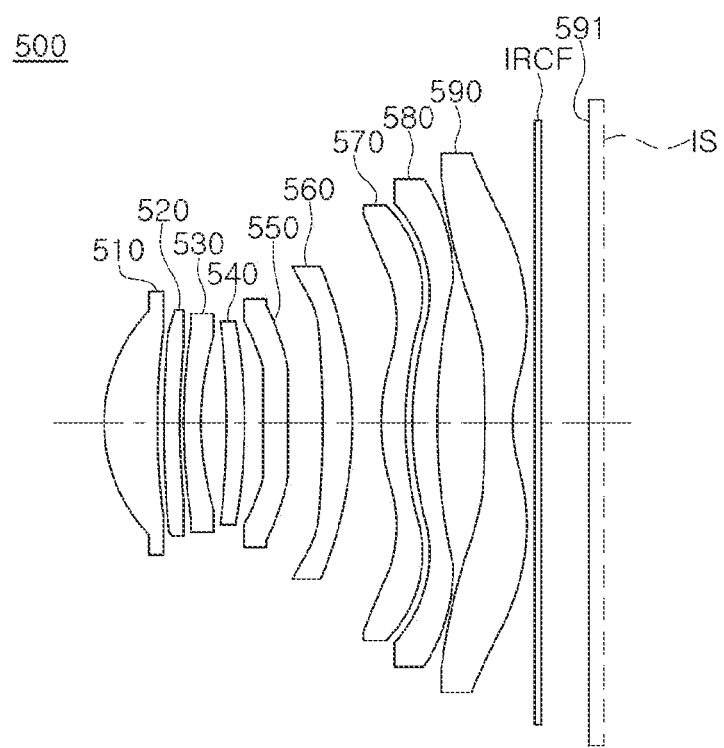
FIG. 9 is a block diagram of an optical imaging system according to a fifth example embodiment of the present disclosure.

An optical imaging system 500 according to a fifth example embodiment of the present disclosure is described with reference to FIGS. 9 and 10.

The optical imaging system 500 according to the fifth example embodiment of the present disclosure may include a first lens 510, a second lens 520, a third lens 530, a fourth lens 540, a fifth lens 550, a sixth lens 560, a seventh lens 570, an eighth lens 580, and a ninth lens 590, and may further include the aperture, the filter IRCF, and the image sensor IS.

The optical imaging system 500 according to the fifth example embodiment of the present disclosure may form the focus on an imaging plane 591. The imaging plane 591 may indicate the surface on which the focus is formed by the optical imaging system. For example, the imaging plane 591 may indicate one surface of the image sensor IS, on which light is received.

Tables 13 and 14 show characteristics of each lens (e.g., radius of curvature, thickness of the lens or distance between the lenses, refractive index, Abbe number, and focal length).

TABLE 13

| Surface no. | Item | Radius of curvature | Thickness or distance | Refractive index | Abbe no. | Focal length |
|---|---|---|---|---|---|---|
| S1 | First lens | 2.733 | 0.930 | 1.546 | 56.0 | 6.209 |
| S2 |  | 12.395 | 0.066 |  |  |  |
| S3 | Second lens | 12.018 | 0.280 | 1.546 | 56.0 | 125.456 |
| S4 |  | 14.454 | 0.053 |  |  |  |
| S5 | Third lens | 9.129 | 0.260 | 1.687 | 18.4 | −14.898 |
| S6 |  | 4.769 | 0.467 |  |  |  |
| S7 | Fourth lens | −54.759 | 0.333 | 1.546 | 56.0 | 3022.289 |
| S8 |  | −53.114 | 0.276 |  |  |  |
| S9 | Fifth lens | 58.921 | 0.400 | 1.667 | 20.4 | −50.003 |
| S10 |  | 21.238 | 0.589 |  |  |  |

TABLE 13-continued

| Surface no. | Item | Radius of curvature | Thickness or distance | Refractive index | Abbe no. | Focal length |
|---|---|---|---|---|---|---|
| S11 | Sixth lens | 11.220 | 0.493 | 1.570 | 37.4 | 69.830 |
| S12 |  | 15.372 | 0.516 |  |  |  |
| S13 | Seventh lens | 3.613 | 0.446 | 1.546 | 56.0 | 8.938 |
| S14 |  | 13.295 | 0.090 |  |  |  |
| S15 | Eighth lens | 17.000 | 0.380 | 1.570 | 37.4 | −886.026 |
| S16 |  | 16.313 | 0.766 |  |  |  |
| S17 | Ninth lens | 6.030 | 0.501 | 1.546 | 56.0 | −5.865 |
| S18 |  | 2.031 | 0.370 |  |  |  |
| S19 | Filter | Infinity | 0.110 | 1.518 | 64.2 |  |
| S20 |  | Infinity | 0.790 |  |  |  |
| S21 | Imaging plane | Infinity |  |  |  |  |

TABLE 14

| f | 6.892 |
|---|---|
| f12 | 5.914 |
| FOV | 75.1 |
| SAG11 | 0.769 |
| SA11 | 41.5 |
| SA12 | 6.2 |
| SA21 | 8.4 |
| SA22 | 3.5 |
| SA31 | 17 |
| SA32 | 27.9 |
| SA41 | 10.1 |
| SA42 | 16.9 |
| SA51 | 39.9 |
| SA52 | 33.1 |
| SA61 | 36.5 |
| SA62 | 21.4 |
| SA71 | 25.8 |
| SA72 | 46.9 |
| SA81 | 44.4 |
| SA82 | 33.3 |
| SA91 | 19.2 |
| SA92 | 28.1 |

A definition of a parameter illustrated in Table 14 may be the same as in the first example embodiment.

1.81 is an Fno of the optical imaging system 500 according to the fifth example embodiment of the present disclosure.

In the fifth example embodiment of the present disclosure, the first lens 510 may have positive refractive power, and the convex first surface and the concave second surface.

The second lens 520 may have positive refractive power, and the convex first surface and the concave second surface.

The third lens 530 may have negative refractive power, and the convex first surface and the concave second surface.

The fourth lens 540 may have positive refractive power, and the concave first surface and the convex second surface.

The fifth lens 550 may have negative refractive power, and the first surface convex in the paraxial region and the second surface concave in the paraxial region.

In addition, at least one inflection point may be formed in a region other than the paraxial region on at least one of the first and second surfaces of the fifth lens 550. For example, the first surface of the fifth lens 550 may be convex in the paraxial region and concave in the region other than the paraxial region. The second surface of the fifth lens 550 may be concave in the paraxial region and convex in the region other than the paraxial region.

The sixth lens 560 may have positive refractive power, and the first surface convex in the paraxial region and the second surface concave in the paraxial region.

In addition, at least one inflection point may be formed in a region other than the paraxial region on at least one of the first and second surfaces of the sixth lens 560. For example, the first surface of the sixth lens 560 may be convex in the paraxial region and concave in the region other than the paraxial region. The second surface of the sixth lens 560 may be concave in the paraxial region and convex in the region other than the paraxial region.

The seventh lens 570 may have positive refractive power, and the first surface convex in the paraxial region and the second surface concave in the paraxial region.

In addition, at least one inflection point may be formed in a region other than the paraxial region on at least one of the first and second surfaces of the seventh lens 570. For example, the first surface of the seventh lens 570 may be convex in the paraxial region and concave in the region other than the paraxial region. The second surface of the seventh lens 570 may be concave in the paraxial region and convex in the region other than the paraxial region.

The eighth lens 580 may have negative refractive power, and the first surface convex in the paraxial region and the second surface concave in the paraxial region.

In addition, at least one inflection point may be formed in a region other than the paraxial region on at least one of the first and second surfaces of the eighth lens 580. For example, the first surface of the eighth lens 580 may be convex in the paraxial region and concave in the region other than the paraxial region. The second surface of the eighth lens 580 may be concave in the paraxial region and convex in the region other than the paraxial region.

The ninth lens 590 may have negative refractive power, and the first surface convex in the paraxial region and the second surface concave in the paraxial region.

In addition, at least one inflection point may be formed in a region other than the paraxial region on at least one of the first and second surfaces of the ninth lens 590. For example, the first surface of the ninth lens 590 may be convex in the paraxial region and concave in the region other than the paraxial region. The second surface of the ninth lens 590 may be concave in the paraxial region and convex in the region other than the paraxial region.

Meanwhile, each surface of the first lens 510 to the ninth lens 590 may have an aspherical coefficient as illustrated in Table 15. For example, the object-side surfaces and image-side surfaces of the first lens 510 to the ninth lens 590 may all be the aspherical surfaces.

TABLE 15

|  | S1 | S2 | S3 | S4 | S5 | S6 |
|---|---|---|---|---|---|---|
| Conic constant K | −1.0325 | 24.3947 | 24.2626 | 25.1850 | 18.9501 | 2.3038 |
| $4^{th}$ coefficient A | 2.2300E−03 | −3.4135E−02 | −4.6070E−02 | −5.7811E−02 | −6.4938E−02 | −1.9434E−02 |
| $6^{th}$ coefficient B | 3.0549E−02 | 1.1122E−01 | 1.7099E−01 | 2.4464E−01 | 2.7175E−01 | 2.8396E−02 |
| $8^{th}$ coefficient C | −1.2573E−01 | −3.5016E−01 | −5.5149E−01 | −8.3880E−01 | −1.1009E+00 | −4.2830E−02 |
| $10^{th}$ coefficient D | 3.2605E−01 | 7.8027E−01 | 1.2721E+00 | 2.1110E+00 | 3.2168E+00 | −4.2112E−02 |
| $12^{th}$ coefficient E | −5.5696E−01 | −1.2034E+00 | −2.0445E+00 | −3.7901E+00 | −6.5718E+00 | 5.4412E−01 |
| $14^{th}$ coefficient F | 6.5353E−01 | 1.3193E+00 | 2.3326E+00 | 4.8662E+00 | 9.5075E+00 | −1.7135E+00 |
| $16^{th}$ coefficient G | −5.4129E−01 | −1.0535E+00 | −1.9271E+00 | −4.5170E+00 | −9.8906E+00 | 3.1159E+00 |
| $18^{th}$ coefficient H | 3.2128E−01 | 6.2085E−01 | 1.1660E+00 | 3.0543E+00 | 7.4676E+00 | −3.7199E+00 |
| $20^{th}$ coefficient J | −1.3718E−01 | −2.7036E−01 | −5.1703E−01 | −1.5037E+00 | −4.0936E+00 | 3.0408E+00 |
| $22^{th}$ coefficient L | 4.1782E−02 | 8.5941E−02 | 1.6605E−01 | 5.3284E−01 | 1.6117E+00 | −1.7173E+00 |
| $24^{th}$ coefficient M | −8.8554E−03 | −1.9378E−02 | −3.7571E−02 | −1.3228E−01 | −4.4379E−01 | 6.5994E−01 |
| $26^{th}$ coefficient N | 1.2408E−03 | 2.9331E−03 | 5.6752E−03 | 2.1815E−02 | 8.1092E−02 | −1.6490E−01 |
| $28^{th}$ coefficient O | −1.0331E−04 | −2.6699E−04 | −5.1338E−04 | −2.1452E−03 | −8.8294E−03 | 2.4171E−02 |
| $30^{th}$ coefficient P | 3.8703E−06 | 1.1034E−05 | 2.1023E−05 | 9.5115E−05 | 4.3338E−04 | −1.5778E−03 |

|  | S7 | S8 | S9 | S10 | S11 | S12 |
|---|---|---|---|---|---|---|
| Conic constant K | 94.9813 | 24.4712 | 1.6345 | −5.5726 | −31.7127 | −81.9689 |

TABLE 15-continued

| | | | | | | |
|---|---|---|---|---|---|---|
| 4th coefficient A | 1.2524E-02 | -2.4046E-02 | -5.2085E-02 | -4.0243E-02 | -4.2807E-02 | -6.3118E-02 |
| 6th coefficient B | -2.5625E-01 | 4.5331E-02 | 7.4109E-02 | 6.6385E-03 | 1.8965E-02 | 1.3843E-02 |
| 8th coefficient C | 1.3553E+00 | -2.7933E-01 | -2.6809E-01 | 3.4328E-02 | -2.2576E-03 | 1.2763E-02 |
| 10th coefficient D | -4.5690E+00 | 1.0574E+00 | 6.9128E-01 | -1.2836E-01 | -6.9689E-03 | -2.1571E-02 |
| 12th coefficient E | 1.0399E+01 | -2.5593E+00 | -1.2584E+00 | 2.3915E-01 | 7.9937E-03 | 1.7401E-02 |
| 14th coefficient F | -1.6585E+01 | 4.1820E+00 | 1.6471E+00 | -2.8820E-01 | -5.1646E-03 | -9.1851E-03 |
| 16th coefficient G | 1.8962E+01 | -4.7772E+00 | -1.5795E+00 | 2.4030E-01 | 2.3074E-03 | 3.3712E-03 |
| 18th coefficient H | -1.5715E+01 | 3.8899E+00 | 1.1210E+00 | -1.4233E-01 | -7.4495E-04 | -8.7419E-04 |
| 20th coefficient J | 9.4481E+00 | -2.2719E+00 | -5.8872E-01 | 6.0363E-02 | 1.7552E-04 | 1.6035E-04 |
| 22nd coefficient L | -4.0756E+00 | 9.4504E-01 | 2.2581E-01 | -1.8205E-02 | -3.0008E-05 | -2.0613E-05 |
| 24th coefficient M | 1.2283E+00 | -2.7336E-01 | -6.1431E-02 | 3.8129E-03 | 3.6301E-06 | 1.8131E-06 |
| 26th coefficient N | -2.4531E-01 | 5.2268E-02 | 1.1211E-02 | -5.2717E-04 | -2.9391E-07 | -1.0384E-07 |
| 28th coefficient O | 2.9150E-02 | -5.9400E-03 | -1.2285E-03 | 4.3272E-05 | 1.4216E-08 | 3.4869E-09 |
| 30th coefficient P | -1.5588E-03 | 3.0384E-04 | 6.0961E-05 | -1.5975E-06 | -3.0890E-10 | -5.2076E-11 |

| | S13 | S14 | S15 | S16 | S17 | S18 |
|---|---|---|---|---|---|---|
| Conic constant K | -4.4171 | -29.8505 | -36.3656 | 11.9405 | -72.7544 | -6.9289 |
| 4th coefficient A | -1.2227E-03 | 3.2850E-02 | 2.2232E-02 | 1.8544E-02 | -6.7022E-02 | -4.6181E-02 |
| 6th coefficient B | -1.3550E-02 | -1.2847E-02 | 4.0171E-03 | 4.5859E-03 | 2.1490E-02 | 1.6261E-02 |
| 8th coefficient C | 1.1748E-02 | 2.9903E-03 | -1.0498E-02 | -8.2105E-03 | -3.3579E-03 | -4.6436E-03 |
| 10th coefficient D | -6.9950E-03 | -7.6597E-04 | 5.6294E-03 | 3.6185E-03 | -2.5014E-04 | 9.8300E-04 |
| 12th coefficient E | 2.6562E-03 | 1.1421E-04 | -1.7926E-03 | -9.2803E-04 | 2.5597E-04 | -1.5069E-04 |
| 14th coefficient F | -6.7782E-04 | 1.7229E-05 | 3.9028E-04 | 1.5890E-04 | -6.1592E-05 | 1.5360E-05 |
| 16th coefficient G | 1.2165E-04 | -1.2182E-05 | -6.0922E-05 | -1.9035E-05 | 8.5092E-06 | -7.7197E-07 |
| 18th coefficient H | -1.5701E-05 | 2.7824E-06 | 6.9617E-06 | 1.6249E-06 | -7.7092E-07 | -2.8932E-08 |
| 20th coefficient J | 1.4642E-06 | -3.7221E-07 | -5.8612E-07 | -9.9364E-08 | 4.7836E-08 | 8.2719E-09 |
| 22nd coefficient L | -9.7700E-08 | 3.2305E-08 | 3.6086E-08 | 4.3366E-09 | -2.0520E-09 | -6.8138E-10 |
| 24th coefficient M | 4.5422E-09 | -1.8501E-09 | -1.5841E-09 | -1.3348E-10 | 5.9929E-11 | 3.1542E-11 |
| 26th coefficient N | -1.3959E-10 | 6.7749E-11 | 4.7003E-11 | 2.8221E-12 | -1.1383E-12 | -8.7237E-13 |
| 28th coefficient O | 2.5468E-12 | -1.4412E-12 | -8.4442E-13 | -3.8191E-14 | 1.2684E-14 | 1.3496E-14 |
| 30th coefficient P | -2.0873E-14 | 1.3567E-14 | 6.9264E-15 | 2.5863E-16 | -6.2923E-17 | -9.0175E-17 |

Figure 10:
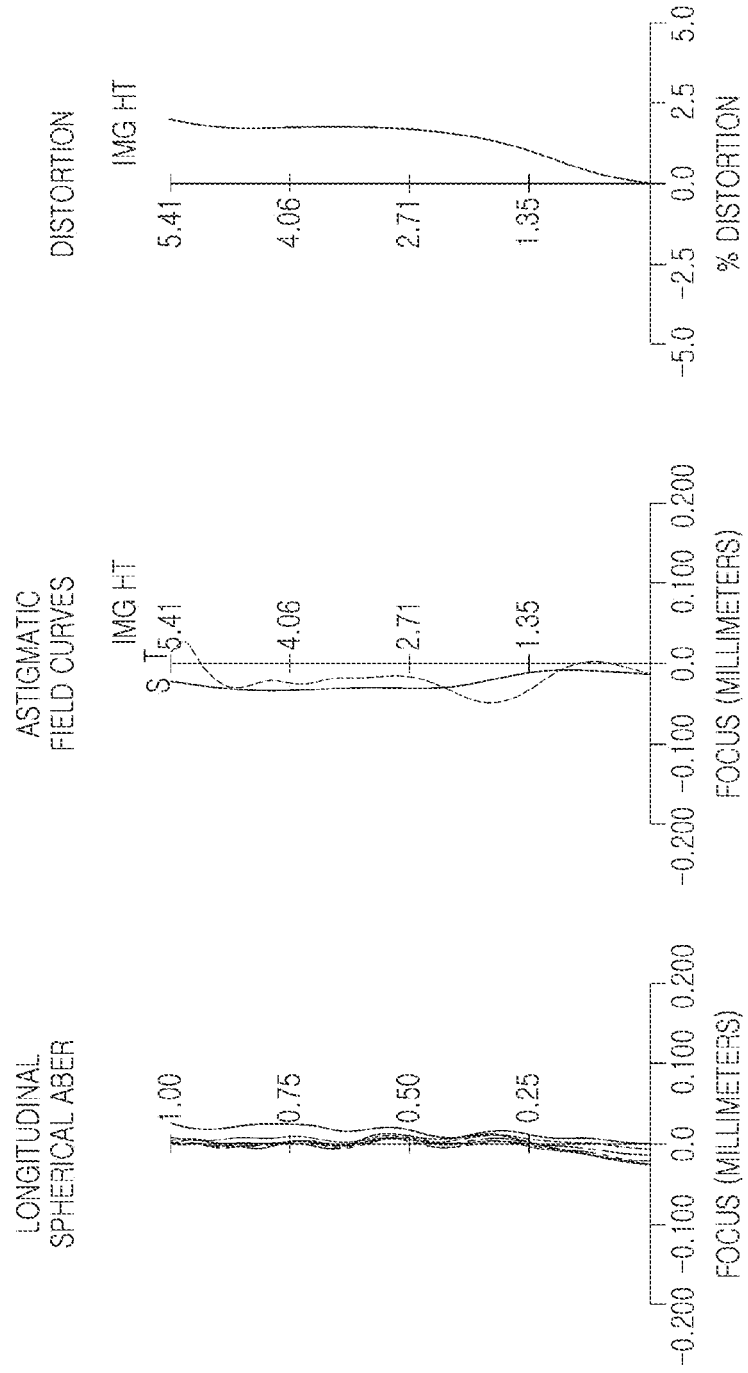
FIG. 10 shows graphs having curves representing aberration characteristics of the optical imaging system illustrated in FIG. 9.

In addition, the optical imaging system configured as described above may have aberration characteristics illustrated in FIG. 10.

Figure 11:
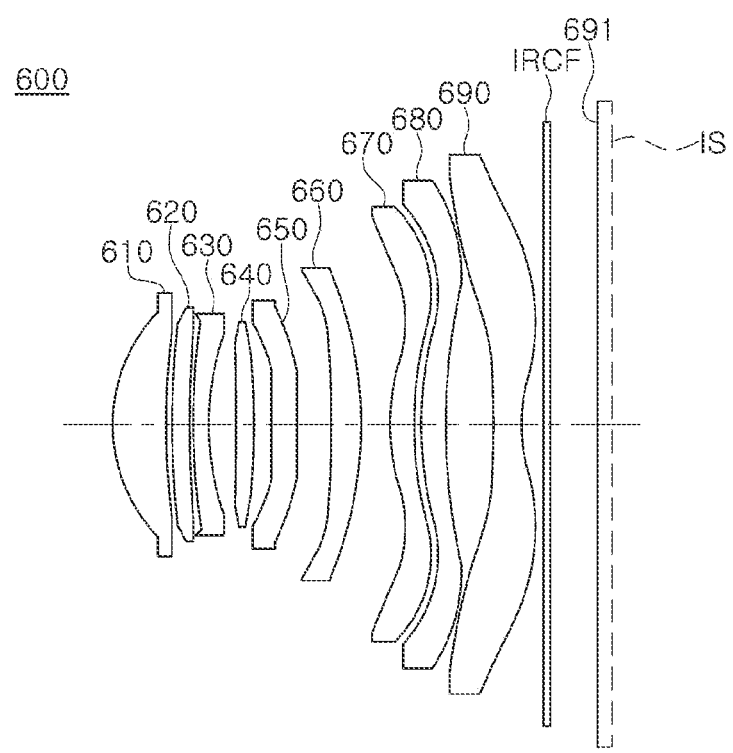
FIG. 11 is a block diagram of an optical imaging system according to a sixth example embodiment of the present disclosure.

An optical imaging system 600 according to a sixth example embodiment of the present disclosure is described with reference to FIGS. 11 and 12.

The optical imaging system 600 according to the sixth example embodiment of the present disclosure may include a first lens 610, a second lens 620, a third lens 630, a fourth lens 640, a fifth lens 650, a sixth lens 660, a seventh lens 670, an eighth lens 680, and a ninth lens 690, and may further include the aperture, the filter IRCF, and the image sensor IS.

The optical imaging system 600 according to the sixth example embodiment of the present disclosure may form the focus on an imaging plane 691. The imaging plane 691 may indicate the surface on which the focus is formed by the optical imaging system. For example, the imaging plane 691 may indicate one surface of the image sensor IS, on which light is received.

Tables 16 and 17 show characteristics of each lens (e.g., radius of curvature, thickness of the lens or distance between the lenses, refractive index, Abbe number, and focal length).

TABLE 16

| Surface no. | Item | Radius of curvature | Thickness or distance | Refractive index | Abbe no. | Focal length |
|---|---|---|---|---|---|---|
| S1 | First lens | 2.738 | 0.914 | 1.546 | 56.0 | 6.202 |
| S2 | | 12.250 | 0.066 | | | |
| S3 | Second lens | 11.925 | 0.294 | 1.546 | 56.0 | 129.516 |
| S4 | | 15.278 | 0.062 | | | |
| S5 | Third lens | 9.520 | 0.242 | 1.677 | 19.2 | -14.934 |
| S6 | | 4.747 | 0.460 | | | |
| S7 | Fourth lens | -80.000 | 0.307 | 1.546 | 56.0 | -933.596 |
| S8 | | -82.565 | 0.270 | | | |
| S9 | Fifth lens | 33.511 | 0.379 | 1.667 | 20.4 | -51.789 |
| S10 | | 15.957 | 0.577 | | | |
| S11 | Sixth lens | 9.556 | 0.494 | 1.570 | 37.4 | 70.584 |

TABLE 16-continued

| Surface no. | Item | Radius of curvature | Thickness or distance | Refractive index | Abbe no. | Focal length |
|---|---|---|---|---|---|---|
| S12 | | 12.984 | 0.543 | | | |
| S13 | Seventh lens | 3.650 | 0.423 | 1.546 | 56.0 | 8.946 |
| S14 | | 15.738 | 0.090 | | | |
| S15 | Eighth lens | 15.925 | 0.403 | 1.570 | 37.4 | −886.213 |
| S16 | | 16.398 | 0.764 | | | |
| S17 | Ninth lens | 6.195 | 0.494 | 1.546 | 56.0 | −5.912 |
| S18 | | 2.020 | 0.370 | | | |
| S19 | Filter | Infinity | 0.110 | 1.518 | 64.2 | |
| S20 | | Infinity | 0.808 | | | |
| S21 | Imaging plane | Infinity | | | | |

TABLE 17

| | |
|---|---|
| f | 6.897 |
| f12 | 5.915 |
| FOV | 75.1 |
| SAG11 | 0.77 |
| SA11 | 41.6 |
| SA12 | 5.9 |
| SA21 | 7.7 |
| SA22 | 2.8 |
| SA31 | 15.3 |
| SA32 | 28.1 |
| SA41 | 9.7 |
| SA42 | 15.9 |
| SA51 | 39.3 |
| SA52 | 32.2 |
| SA61 | 35.8 |
| SA62 | 21.4 |
| SA71 | 26.1 |
| SA72 | 46.2 |
| SA81 | 44.5 |
| SA82 | 35.7 |
| SA91 | 19.7 |
| SA92 | 28.2 |

A definition of a parameter illustrated in Table 17 may be the same as in the first example embodiment.

1.80 is an Fno of the optical imaging system 600 according to the sixth example embodiment of the present disclosure.

In the sixth example embodiment of the present disclosure, the first lens 610 may have positive refractive power, and the convex first surface and the concave second surface.

The second lens 620 may have positive refractive power, and the convex first surface and the concave second surface.

The third lens 630 may have negative refractive power, and the convex first surface and the concave second surface.

The fourth lens 640 may have negative refractive power, and the concave first surface and the convex second surface.

The fifth lens 650 may have negative refractive power, and the first surface convex in the paraxial region and the second surface concave in the paraxial region.

In addition, at least one inflection point may be formed in a region other than the paraxial region on at least one of the first and second surfaces of the fifth lens 650. For example, the first surface of the fifth lens 650 may be convex in the paraxial region and concave in the region other than the paraxial region. The second surface of the fifth lens 650 may be concave in the paraxial region and convex in the region other than the paraxial region.

The sixth lens 660 may have positive refractive power, and the first surface convex in the paraxial region and the second surface concave in the paraxial region.

In addition, at least one inflection point may be formed in a region other than the paraxial region on at least one of the first and second surfaces of the sixth lens 660. For example, the first surface of the sixth lens 660 may be convex in the paraxial region and concave in the region other than the paraxial region. The second surface of the sixth lens 660 may be concave in the paraxial region and convex in the region other than the paraxial region.

The seventh lens 670 may have positive refractive power, and the first surface convex in the paraxial region and the second surface concave in the paraxial region.

In addition, at least one inflection point may be formed in a region other than the paraxial region on at least one of the first and second surfaces of the seventh lens 670. For example, the first surface of the seventh lens 670 may be convex in the paraxial region and concave in the region other than the paraxial region. The second surface of the seventh lens 670 may be concave in the paraxial region and convex in the region other than the paraxial region.

The eighth lens 680 may have positive refractive power, and the first surface convex in the paraxial region and the second surface concave in the paraxial region.

In addition, at least one inflection point may be formed in a region other than the paraxial region on at least one of the first and second surfaces of the eighth lens 680. For example, the first surface of the eighth lens 680 may be convex in the paraxial region and concave in the region other than the paraxial region. The second surface of the eighth lens 680 may be concave in the paraxial region and convex in the region other than the paraxial region.

The ninth lens 690 may have negative refractive power, and the first surface convex in the paraxial region and the second surface concave in the paraxial region.

In addition, at least one inflection point may be formed in a region other than the paraxial region on at least one of the first and second surfaces of the ninth lens 690. For example, the first surface of the ninth lens 690 may be convex in the paraxial region and concave in the region other than the paraxial region. The second surface of the ninth lens 690 may be concave in the paraxial region and convex in the region other than the paraxial region.

Meanwhile, each surface of the first lens 610 to the ninth lens 690 may have an aspherical coefficient as illustrated in Table 18. For example, the object-side surfaces and image-side surfaces of the first lens 610 to the ninth lens 690 may all be the aspherical surfaces.

TABLE 18

| | S1 | S2 | S3 | S4 | S5 | S6 |
|---|---|---|---|---|---|---|
| Conic constant K | −1.0257 | 24.0094 | 24.2850 | 23.6839 | 18.7850 | 2.2909 |
| $4^{th}$ coefficient A | 3.9071E−03 | −3.9125E−02 | −5.0208E−02 | −5.8730E−02 | −6.1362E−02 | −1.4019E−02 |
| $6^{th}$ coefficient B | 1.8217E−02 | 1.5393E−01 | 2.0735E−01 | 2.7911E−01 | 2.5405E−01 | −3.3837E−02 |
| $8^{th}$ coefficient C | −8.1757E−02 | −5.2265E−01 | −6.9820E−01 | −1.0643E+00 | −1.0456E+00 | 3.5698E−01 |
| $10^{th}$ coefficient D | 2.3269E−01 | 1.1932E+00 | 1.6102E+00 | 2.8227E+00 | 3.0037E+00 | −1.6672E+00 |

TABLE 18-continued

|  |  |  |  |  |  |  |
|---|---|---|---|---|---|---|
| $12^{th}$ coefficient E | −4.2765E−01 | −1.8412E+00 | −2.5239E+00 | −5.1320E+00 | −5.8773E+00 | 4.8984E+00 |
| $14^{th}$ coefficient F | 5.3039E−01 | 1.9860E+00 | 2.7606E+00 | 6.5225E+00 | 8.0221E+00 | −9.6720E+00 |
| $16^{th}$ coefficient G | −4.5819E−01 | −1.5386E+00 | −2.1597E+00 | −5.9190E+00 | −7.8082E+00 | 1.3294E+01 |
| $18^{th}$ coefficient H | 2.8093E−01 | 8.6972E−01 | 1.2268E+00 | 3.8862E+00 | 5.4911E+00 | −1.2965E+01 |
| $20^{th}$ coefficient J | −1.2305E−01 | −3.6005E−01 | −5.0779E−01 | −1.8512E+00 | −2.7970E+00 | 9.0286E+00 |
| $22^{th}$ coefficient L | 3.8251E−02 | 1.0814E−01 | 1.5173E−01 | 6.3366E−01 | 1.0219E+00 | −4.4590E+00 |
| $24^{th}$ coefficient M | −8.2426E−03 | −2.2954E−02 | −3.1889E−02 | −1.5186E−01 | −2.6087E−01 | 1.5255E+00 |
| $26^{th}$ coefficient N | 1.1709E−03 | 3.2658E−03 | 4.4721E−03 | 2.4174E−02 | 4.4154E−02 | −3.4377E−01 |
| $28^{th}$ coefficient O | −9.8629E−05 | −2.7950E−04 | −3.7563E−04 | −2.2949E−03 | −4.4479E−03 | 4.5898E−02 |
| $30^{th}$ coefficient P | 3.7314E−06 | 1.0878E−05 | 1.4293E−05 | 9.8257E−05 | 2.0166E−04 | −2.7503E−03 |

|  | S7 | S8 | S9 | S10 | S11 | S12 |
|---|---|---|---|---|---|---|
| Conic constant K | −63.4092 | 94.1802 | 28.4250 | −10.9947 | −27.1098 | −93.0928 |
| $4^{th}$ coefficient A | −2.7887E−03 | −3.2706E−02 | −4.9260E−02 | −3.6167E−02 | −4.3209E−02 | −6.1793E−02 |
| $6^{th}$ coefficient B | −8.8393E−02 | 1.3041E−01 | 6.1985E−02 | −1.9189E−02 | 1.7960E−02 | 9.6713E−03 |
| $8^{th}$ coefficient C | 4.1885E−01 | −6.6383E−01 | −2.3219E−01 | 1.2615E−01 | 7.3668E−05 | 1.8703E−02 |
| $10^{th}$ coefficient D | −1.2908E+00 | 2.1495E+00 | 6.3639E−01 | −3.3258E−01 | −7.9463E−03 | −2.6585E−02 |
| $12^{th}$ coefficient E | 2.6488E+00 | −4.7054E+00 | −1.2632E+00 | 5.3978E−01 | 6.6032E−03 | 2.0073E−02 |
| $14^{th}$ coefficient F | −3.7418E+00 | 7.2087E+00 | 1.8180E+00 | −5.9527E−01 | −3.0348E−03 | −1.0127E−02 |
| $16^{th}$ coefficient G | 3.7205E+00 | −7.8900E+00 | −1.9091E+00 | 4.6443E−01 | 9.0868E−04 | 3.5970E−03 |
| $18^{th}$ coefficient H | −2.6282E+00 | 6.2370E+00 | 1.4678E+00 | −2.6095E−01 | −1.8587E−04 | −9.1141E−04 |
| $20^{th}$ coefficient J | 1.3143E+00 | −3.5649E+00 | −8.2313E−01 | 1.0596E−01 | 2.7205E−05 | 1.6454E−04 |
| $22^{th}$ coefficient L | −4.5660E−01 | 1.4582E+00 | 3.3209E−01 | −3.0805E−02 | −3.2417E−06 | −2.0923E−05 |
| $24^{th}$ coefficient M | 1.0571E−01 | −4.1593E−01 | −9.3673E−02 | 6.2488E−03 | 3.7239E−07 | 1.8271E−06 |
| $26^{th}$ coefficient N | −1.5004E−02 | 7.8528E−02 | 1.7501E−02 | −8.3966E−04 | −3.7603E−08 | −1.0415E−07 |
| $28^{th}$ coefficient O | 1.0838E−03 | −8.8161E−03 | −1.9427E−03 | 6.7145E−05 | 2.4384E−09 | 3.4874E−09 |
| $30^{th}$ coefficient P | −2.1695E−05 | 4.4541E−04 | 9.6852E−05 | −2.4188E−06 | −6.8747E−11 | −5.2005E−11 |

|  | S13 | S14 | S15 | S16 | S17 | S18 |
|---|---|---|---|---|---|---|
| Conic constant K | −4.4968 | −30.1698 | −49.9545 | 11.9430 | −86.8829 | −7.1036 |
| $4^{th}$ coefficient A | −9.6582E−04 | 3.1348E−02 | 2.5298E−02 | 2.3795E−02 | −6.3599E−02 | −4.4999E−02 |
| $6^{th}$ coefficient B | −1.4153E−02 | −1.1918E−02 | −1.5433E−03 | −2.8803E−03 | 1.7576E−02 | 1.5569E−02 |
| $8^{th}$ coefficient C | 1.2345E−02 | 2.7361E−03 | −5.8790E−03 | −2.8503E−03 | −1.2609E−03 | −4.6655E−03 |
| $10^{th}$ coefficient D | −7.3534E−03 | −7.2702E−04 | 3.4365E−03 | 1.3201E−03 | −8.9753E−04 | 1.1515E−03 |
| $12^{th}$ coefficient E | 2.7934E−03 | 1.1648E−04 | −1.1325E−03 | −2.9795E−04 | 3.8085E−04 | −2.3186E−04 |
| $14^{th}$ coefficient F | −7.1285E−04 | 1.3803E−05 | 2.5650E−04 | 4.3051E−05 | −7.7172E−05 | 3.6111E−05 |
| $16^{th}$ coefficient G | 1.2784E−04 | −1.1113E−05 | −4.2002E−05 | −4.3892E−06 | 9.7580E−06 | −4.1404E−06 |
| $18^{th}$ coefficient H | −1.6478E−05 | 2.5826E−06 | 5.0576E−06 | 3.5203E−07 | −8.2930E−07 | 3.4032E−07 |
| $20^{th}$ coefficient J | 1.5342E−06 | −3.4670E−07 | −4.4873E−07 | −2.5894E−08 | 4.8753E−08 | −1.9740E−08 |
| $22^{th}$ coefficient L | −1.0219E−07 | 3.0015E−08 | 2.9009E−08 | 1.8303E−09 | −1.9831E−09 | 7.9348E−10 |
| $24^{th}$ coefficient M | 4.7440E−09 | −1.7077E−09 | −1.3288E−09 | −1.0661E−10 | 5.4753E−11 | −2.1413E−11 |
| $26^{th}$ coefficient N | −1.4562E−10 | 6.1940E−11 | 4.0826E−11 | 4.2519E−12 | −9.7660E−13 | 3.6541E−13 |
| $28^{th}$ coefficient O | 2.6547E−12 | −1.3018E−12 | −7.5349E−13 | −9.8551E−14 | 1.0110E−14 | −3.4928E−15 |
| $30^{th}$ coefficient P | −2.1749E−14 | 1.2084E−14 | 6.3036E−15 | 9.9092E−16 | −4.5878E−17 | 1.3736E−17 |

Figure 12:
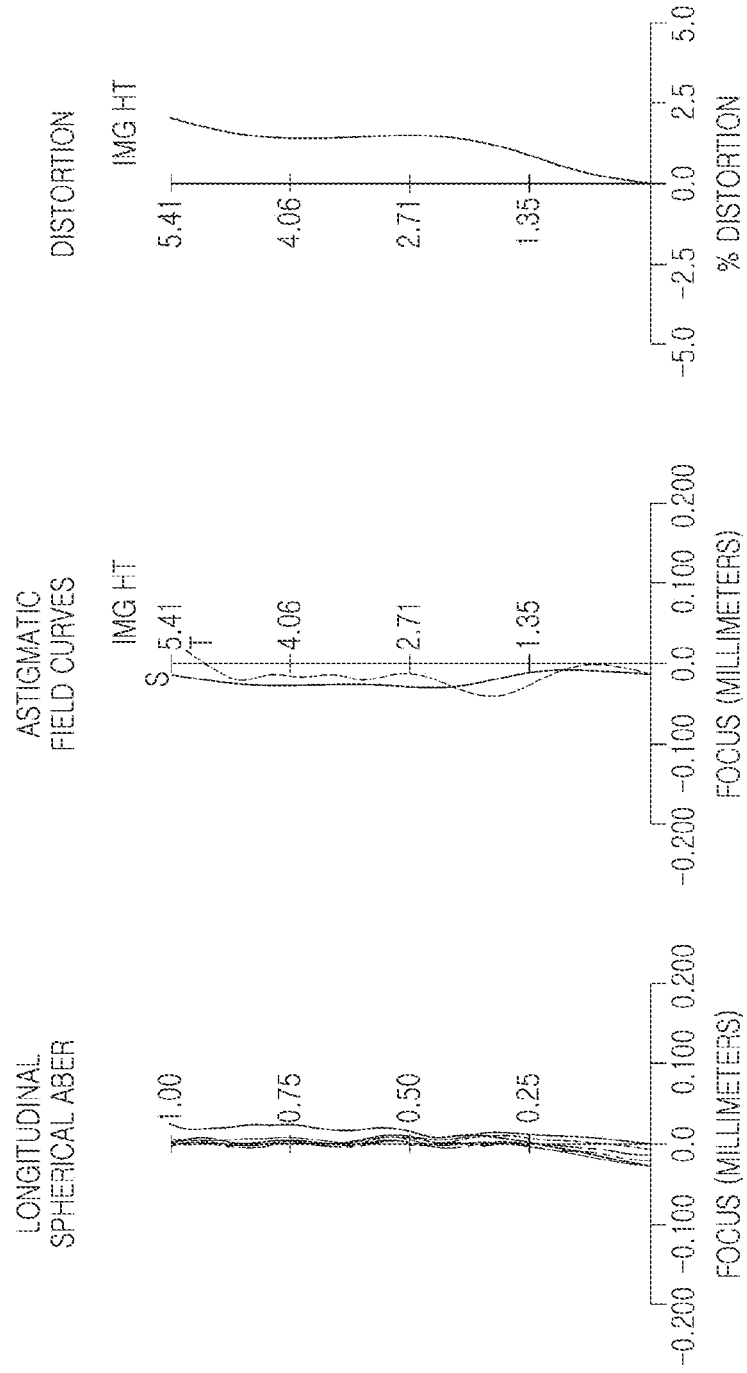
FIG. 12 shows graphs having curves representing aberration characteristics of the optical imaging system illustrated in FIG. 11.

In addition, the optical imaging system configured as described above may have aberration characteristics as illustrated in FIG. 12.

Figure 13:
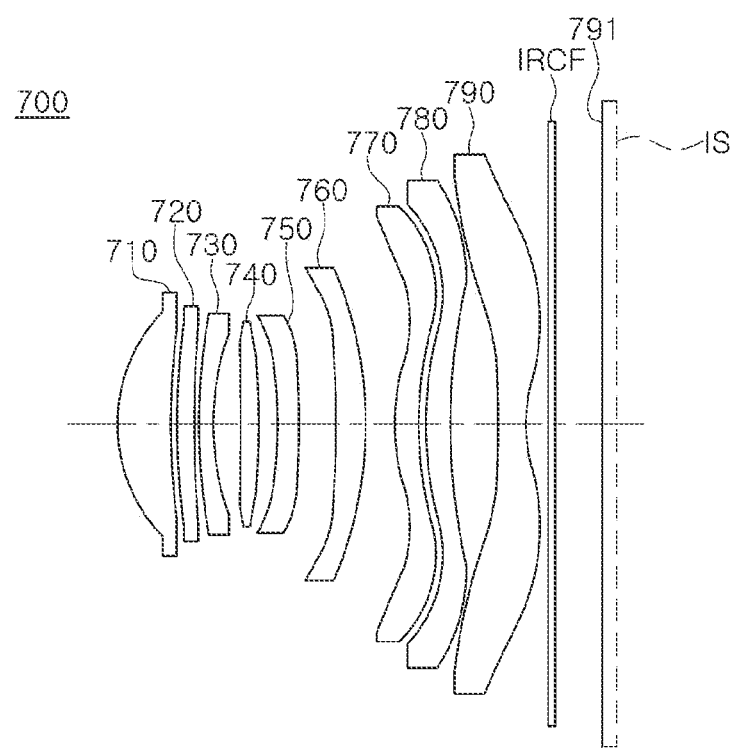
FIG. 13 is a block diagram of an optical imaging system according to a seventh example embodiment of the present disclosure.

An optical imaging system 700 according to a seventh example embodiment of the present disclosure is described with reference to FIGS. 13 and 14.

The optical imaging system 700 according to the seventh example embodiment of the present disclosure may include a first lens 710, a second lens 720, a third lens 730, a fourth lens 740, a fifth lens 750, a sixth lens 760, a seventh lens 770, an eighth lens 780, and a ninth lens 790, and may further include the aperture, the filter IRCF, and the image sensor IS.

The optical imaging system 700 according to the seventh example embodiment of the present disclosure may form the focus on an imaging plane 791. The imaging plane 791 may indicate the surface on which the focus is formed by the optical imaging system. For example, the imaging plane 791 may indicate one surface of the image sensor IS, on which light is received.

Tables 19 and 20 show characteristics of each lens (e.g., radius of curvature, thickness of the lens or distance between the lenses, refractive index, Abbe number, and focal length).

TABLE 19

| Surface no. | Item | Radius of curvature | Thickness or distance | Refractive index | Abbe no. | Focal length |
|---|---|---|---|---|---|---|
| S1 | First lens | 2.737 | 0.913 | 1.546 | 56.0 | 6.262 |
| S2 | | 12.091 | 0.065 | | | |
| S3 | Second lens | 11.766 | 0.295 | 1.546 | 56.0 | 92.074 |
| S4 | | 15.223 | 0.059 | | | |
| S5 | Third lens | 9.481 | 0.242 | 1.677 | 19.2 | −14.344 |
| S6 | | 4.748 | 0.466 | | | |
| S7 | Fourth lens | −81.868 | 0.318 | 1.546 | 56.0 | 1505.037 |
| S8 | | −74.556 | 0.273 | | | |
| S9 | Fifth lens | 35.458 | 0.375 | 1.667 | 20.4 | −46.461 |
| S10 | | 16.466 | 0.582 | | | |
| S11 | Sixth lens | 9.971 | 0.499 | 1.570 | 37.4 | 60.447 |
| S12 | | 13.773 | 0.538 | | | |
| S13 | Seventh lens | 3.651 | 0.432 | 1.546 | 56.0 | 9.198 |
| S14 | | 12.801 | 0.090 | | | |
| S15 | Eighth lens | 13.900 | 0.400 | 1.570 | 37.4 | 152.439 |
| S16 | | 16.373 | 0.765 | | | |
| S17 | Ninth lens | 6.079 | 0.494 | 1.546 | 56.0 | −5.791 |
| S18 | | 2.021 | 0.370 | | | |
| S19 | Filter | Infinity | 0.110 | 1.518 | 64.2 | |
| S20 | | Infinity | 0.793 | | | |
| S21 | Imaging plane | Infinity | | | | |

TABLE 20

| | |
|---|---|
| f | 6.84 |
| f12 | 5.874 |
| FOV | 75.5 |
| SAG11 | 0.77 |
| SA11 | 41.6 |
| SA12 | 7.1 |
| SA21 | 8.6 |
| SA22 | 2.9 |
| SA31 | 15.5 |
| SA32 | 28.1 |
| SA41 | 9.6 |
| SA42 | 16 |
| SA51 | 39.4 |
| SA52 | 32.3 |
| SA61 | 36 |
| SA62 | 21.3 |
| SA71 | 25.8 |
| SA72 | 46.5 |
| SA81 | 44.6 |
| SA82 | 35.5 |
| SA91 | 19.5 |
| SA92 | 28.1 |

A definition of a parameter illustrated in Table 20 may be the same as in the first example embodiment.

1.80 is an Fno of the optical imaging system 700 according to the seventh example embodiment of the present disclosure.

In the seventh example embodiment of the present disclosure, the first lens 710 may have positive refractive power, and the convex first surface and the concave second surface.

The second lens 720 may have positive refractive power, and the convex first surface and the concave second surface.

The third lens 730 may have negative refractive power, and the convex first surface and the concave second surface.

The fourth lens 740 may have positive refractive power, and the concave first surface and the convex second surface.

The fifth lens 750 may have negative refractive power, and the first surface convex in the paraxial region and the second surface concave in the paraxial region.

In addition, at least one inflection point may be formed in a region other than the paraxial region on at least one of the first and second surfaces of the fifth lens 750. For example, the first surface of the fifth lens 750 may be convex in the paraxial region and concave in the region other than the paraxial region. The second surface of the fifth lens 750 may be concave in the paraxial region and convex in the region other than the paraxial region.

The sixth lens 760 may have positive refractive power, and the first surface convex in the paraxial region and the second surface concave in the paraxial region.

In addition, at least one inflection point may be formed in a region other than the paraxial region on at least one of the first and second surfaces of the sixth lens 760. For example, the first surface of the sixth lens 760 may be convex in the paraxial region and concave in the region other than the paraxial region. The second surface of the sixth lens 760 may be concave in the paraxial region and convex in the region other than the paraxial region.

The seventh lens 770 may have positive refractive power, and the first surface convex in the paraxial region and the second surface concave in the paraxial region.

In addition, at least one inflection point may be formed in a region other than the paraxial region on at least one of the first and second surfaces of the seventh lens 770. For example, the first surface of the seventh lens 770 may be convex in the paraxial region and concave in the region other than the paraxial region. The second surface of the seventh lens 770 may be concave in the paraxial region and convex in the region other than the paraxial region.

The eighth lens 780 may have positive refractive power, and the first surface convex in the paraxial region and the second surface concave in the paraxial region.

In addition, at least one inflection point may be formed in a region other than the paraxial region on at least one of the first and second surfaces of the eighth lens 780. For example, the first surface of the eighth lens 780 may be convex in the paraxial region and concave in the region other than the paraxial region. The second surface of the eighth lens 780 may be concave in the paraxial region and convex in the region other than the paraxial region.

The ninth lens 790 may have negative refractive power, and the first surface convex in the paraxial region and the second surface concave in the paraxial region.

In addition, at least one inflection point may be formed in a region other than the paraxial region on at least one of the first and second surfaces of the ninth lens 790. For example, the first surface of the ninth lens 790 may be convex in the paraxial region and concave in the region other than the paraxial region. The second surface of the ninth lens 790 may be concave in the paraxial region and convex in the region other than the paraxial region.

Meanwhile, each surface of the first lens 710 to the ninth lens 790 may have an aspherical coefficient as illustrated in Table 21. For example, the object-side surfaces and image-side surfaces of the first lens 710 to the ninth lens 790 may all be the aspherical surfaces.

TABLE 21

|  | S1 | S2 | S3 | S4 | S5 | S6 |
|---|---|---|---|---|---|---|
| Conic constant K | −1.0266 | 24.0335 | 24.2307 | 23.9382 | 18.8359 | 2.2992 |
| 4$^{th}$ coefficient A | 3.3173E−03 | −3.7820E−02 | −4.7741E−02 | −5.6282E−02 | −6.2015E−02 | −1.5261E−02 |
| 6$^{th}$ coefficient B | 2.5198E−02 | 1.3900E−01 | 1.8031E−01 | 2.4938E−01 | 2.5824E−01 | −1.8447E−02 |
| 8$^{th}$ coefficient C | −1.1560E−01 | −4.5314E−01 | −5.6768E−01 | −9.0796E−01 | −1.0726E+00 | 2.5668E−01 |
| 10$^{th}$ coefficient D | 3.2606E−01 | 1.0097E+00 | 1.2463E+00 | 2.3487E+00 | 3.1278E+00 | −1.2628E+00 |
| 12$^{th}$ coefficient E | −5.9252E−01 | −1.5304E+00 | −1.8674E+00 | −4.2015E+00 | −6.2312E+00 | 3.8227E+00 |
| 14$^{th}$ coefficient F | 7.2839E−01 | 1.6261E+00 | 1.9463E+00 | 5.2656E+00 | 8.6706E+00 | −7.7089E+00 |
| 16$^{th}$ coefficient G | −6.2551E−01 | −1.2437E+00 | −1.4412E+00 | −4.7109E+00 | −8.6083E+00 | 1.0772E+01 |
| 18$^{th}$ coefficient H | 3.8219E−01 | 6.9569E−01 | 7.6793E−01 | 3.0461E+00 | 6.1754E+00 | −1.0651E+01 |
| 20$^{th}$ coefficient J | −1.6713E−01 | −2.8575E−01 | −2.9490E−01 | −1.4271E+00 | −3.2083E+00 | 7.5069E+00 |
| 22$^{th}$ coefficient L | 5.1932E−02 | 8.5405E−02 | 8.0646E−02 | 4.7971E−01 | 1.1952E+00 | −3.7479E+00 |
| 24$^{th}$ coefficient M | −1.1197E−02 | −1.8096E−02 | −1.5245E−02 | −1.1270E−01 | −3.1104E−01 | 1.2951E+00 |
| 26$^{th}$ coefficient N | 1.5923E−03 | 2.5779E−03 | 1.8791E−03 | 1.7555E−02 | 5.3653E−02 | −2.9462E−01 |
| 28$^{th}$ coefficient O | −1.3431E−04 | −2.2155E−04 | −1.3436E−04 | −1.6269E−03 | −5.5077E−03 | 3.9689E−02 |
| 30$^{th}$ coefficient P | 5.0894E−06 | 8.6822E−06 | 4.1526E−06 | 6.7814E−05 | 2.5448E−04 | −2.3987E−03 |

|  | S7 | S8 | S9 | S10 | S11 | S12 |
|---|---|---|---|---|---|---|
| Conic constant K | −81.4017 | 87.7749 | 24.2949 | −10.3370 | −10.3370 | −90.0223 |
| 4$^{th}$ coefficient A | 8.0896E−04 | −3.3623E−02 | −5.2464E−02 | −3.7302E−02 | −3.7302E−02 | −6.2192E−02 |
| 6$^{th}$ coefficient B | −1.2826E−01 | 1.3662E−01 | 8.6427E−02 | −1.0836E−02 | −1.0836E−02 | 1.1929E−02 |
| 8$^{th}$ coefficient C | 6.4458E−01 | −6.8945E−01 | −3.3225E−01 | 9.5622E−02 | 9.5622E−02 | 1.5498E−02 |
| 10$^{th}$ coefficient D | −2.0819E+00 | 2.2125E+00 | 8.9396E−01 | −2.6462E−01 | −2.6462E−01 | −2.4386E−02 |
| 12$^{th}$ coefficient E | 4.4988E+00 | −4.7910E+00 | −1.7057E+00 | 4.3956E−01 | 4.3956E−01 | 1.9316E−02 |
| 14$^{th}$ coefficient F | −6.7486E+00 | 7.2533E+00 | 2.3464E+00 | −4.9189E−01 | −4.9189E−01 | −1.0061E−02 |
| 16$^{th}$ coefficient G | 7.1975E+00 | −7.8451E+00 | −2.3588E+00 | 3.8738E−01 | 3.8738E−01 | 3.6485E−03 |
| 18$^{th}$ coefficient H | −5.5228E+00 | 6.1316E+00 | 1.7438E+00 | −2.1882E−01 | −2.1882E−01 | −9.3619E−04 |
| 20$^{th}$ coefficient J | 3.0512E+00 | −3.4678E+00 | −9.4537E−01 | 8.9046E−02 | 8.9046E−02 | 1.7023E−04 |
| 22$^{th}$ coefficient L | −1.1998E+00 | 1.4048E+00 | 3.7069E−01 | −2.5877E−02 | −2.5877E−02 | −2.1729E−05 |
| 24$^{th}$ coefficient M | 3.2658E−01 | −3.9723E−01 | −1.0212E−01 | 5.2370E−03 | 5.2370E−03 | 1.9006E−06 |
| 26$^{th}$ coefficient N | −5.8253E−02 | 7.4419E−02 | 1.8714E−02 | −7.0104E−04 | −7.0104E−04 | −1.0837E−07 |
| 28$^{th}$ coefficient O | 6.0940E−03 | −8.2984E−03 | −2.0447E−03 | 5.5792E−05 | 5.5792E−05 | 3.6270E−09 |
| 30$^{th}$ coefficient P | −2.8140E−04 | 4.1682E−04 | 1.0063E−04 | −1.9990E−06 | −1.9990E−06 | −5.4031E−11 |

|  | S13 | S14 | S15 | S16 | S17 | S18 |
|---|---|---|---|---|---|---|
| Conic constant K | −4.4140 | −30.8854 | −43.9068 | 11.7047 | 11.7047 | −6.9742 |
| 4$^{th}$ coefficient A | −1.6385E−03 | 3.0851E−02 | 2.3664E−02 | 2.1258E−02 | 2.1258E−02 | −4.5730E−02 |
| 6$^{th}$ coefficient B | −1.2294E−02 | −9.7328E−03 | 1.9367E−03 | 9.0168E−04 | 9.0168E−04 | 1.6097E−02 |
| 8$^{th}$ coefficient C | 1.0435E−02 | 1.6191E−04 | −9.0794E−03 | −5.6102E−03 | −5.6102E−03 | −4.7436E−03 |
| 10$^{th}$ coefficient D | −6.2453E−03 | 8.4752E−04 | 5.0791E−03 | 2.5025E−03 | 2.5025E−03 | 1.0861E−03 |

TABLE 21-continued

| | | | | | | |
|---|---|---|---|---|---|---|
| 12th coefficient E | 2.3860E−03 | −4.7859E−04 | −1.6615E−03 | −6.2122E−04 | −6.2122E−04 | −1.9125E−04 |
| 14th coefficient F | −6.1158E−04 | 1.6363E−04 | 3.7048E−04 | 1.0272E−04 | 1.0272E−04 | 2.4908E−05 |
| 16th coefficient G | 1.1017E−04 | −3.7277E−05 | −5.9029E−05 | −1.2068E−05 | −1.2068E−05 | −2.2689E−06 |
| 18th coefficient H | −1.4269E−05 | 5.8200E−06 | 6.8511E−06 | 1.0486E−06 | 1.0486E−06 | 1.3347E−07 |
| 20th coefficient J | 1.3351E−06 | −6.3259E−07 | −5.8229E−07 | −6.9949E−08 | −6.9949E−08 | −4.0838E−09 |
| 22th coefficient L | −8.9363E−08 | 4.7922E−08 | 3.5953E−08 | 3.6942E−09 | 3.6942E−09 | −2.4251E−11 |
| 24th coefficient M | 4.1667E−09 | −2.4852E−09 | −1.5729E−09 | −1.5393E−10 | −1.5393E−10 | 7.6176E−12 |
| 26th coefficient N | −1.2840E−10 | 8.4198E−11 | 4.6272E−11 | 4.7316E−12 | 4.7316E−12 | −3.0427E−13 |
| 28th coefficient O | 2.3483E−12 | −1.6801E−12 | −8.2119E−13 | −9.2578E−14 | −9.2578E−14 | 5.5689E−15 |
| 30th coefficient P | −1.9290E−14 | 1.4978E−14 | 6.6401E−15 | 8.3947E−16 | 8.3947E−16 | −4.0883E−17 |

Figure 14:
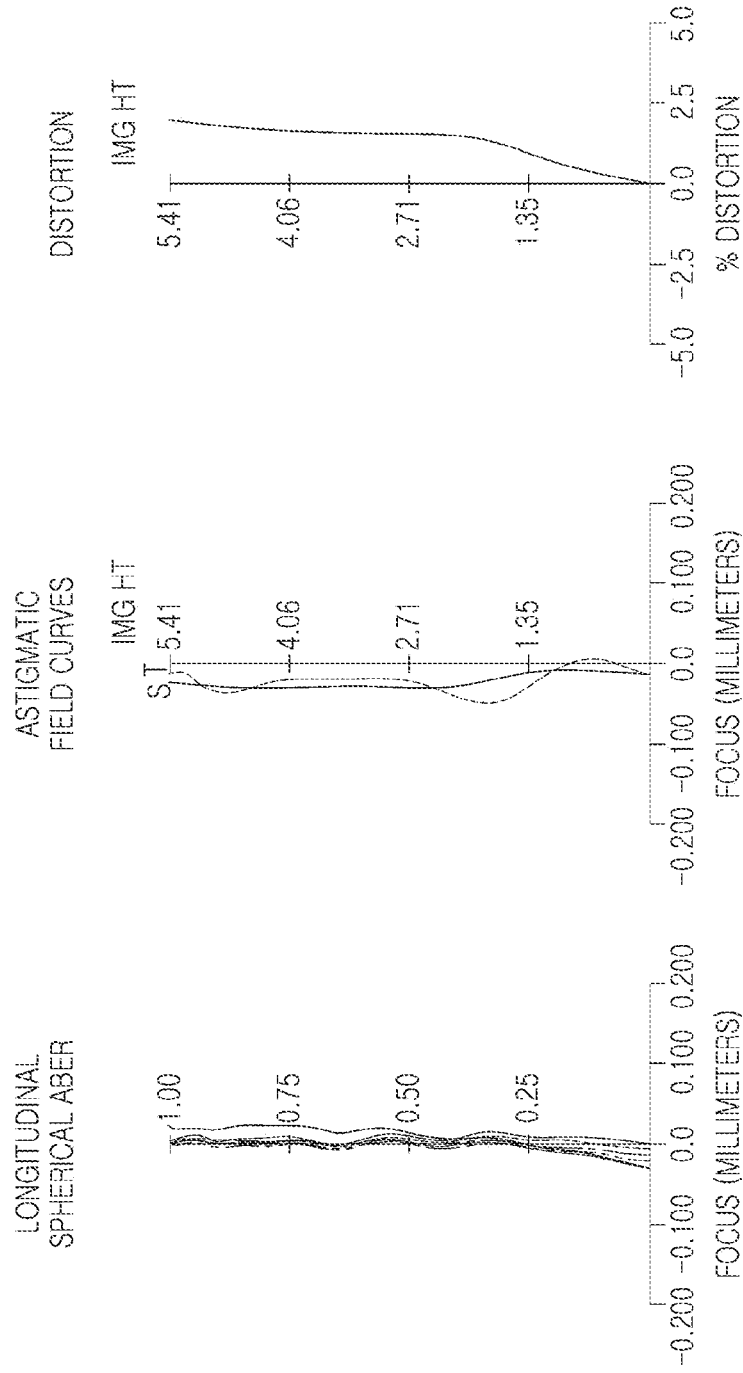
FIG. 14 shows graphs having curves representing aberration characteristics of the optical imaging system illustrated in FIG. 13.

In addition, the optical imaging system configured as described above may have aberration characteristics illustrated in FIG. 14.

Table 22 shows values of conditional expressions used for the optical imaging system according to each example embodiment.

TABLE 22

| Conditional expression | 1st example embodiment | 2nd example embodiment | 3rd example embodiment | 4th example embodiment | 5th example embodiment | 6th example embodiment | 7th example embodiment |
|---|---|---|---|---|---|---|---|
| 0.0 < f1/f < 1.4 | 0.8992 | 0.9239 | 0.9142 | 0.9104 | 0.9009 | 0.8992 | 0.9156 |
| 25 < v1-v3 < 45 | 37.6 | 36.8 | 36.8 | 36.8 | 37.6 | 36.8 | 36.8 |
| 25 < v1-v5 < 45 | 35.6 | 35.6 | 35.6 | 35.6 | 35.6 | 35.6 | 35.6 |
| 15 < v1-v6 < 25 | 18.64 | 18.64 | 18.64 | 18.64 | 18.64 | 18.64 | 18.64 |
| 15 < v7-v8 < 25 | 18.64 | 18.64 | 18.64 | 18.64 | 18.64 | 18.64 | 18.64 |
| 5 < f2/f < 50 | 18.7786 | 13.3471 | 13.4398 | 13.6416 | 18.2031 | 18.7786 | 13.4611 |
| −5 < f3/f < 0 | −2.1653 | −2.0931 | −2.0947 | −2.0869 | −2.1616 | −2.1653 | −2.0971 |
| |f4/f| > 50.0 | 135.3627 | 94.3739 | 719.8098 | 104.9083 | 438.5214 | 135.3627 | 220.0346 |
| −25 < f5/f < 0 | −7.5090 | −6.6402 | −6.9382 | −6.5482 | −7.2553 | −7.5090 | −6.7926 |
| |f6/f| > 2.0 | 10.2340 | 8.0021 | 8.7127 | 8.7253 | 10.1321 | 10.2340 | 8.8372 |
| f7/f < 5.0 | 1.2971 | 1.2161 | 1.2624 | 1.2946 | 1.2969 | 1.2971 | 1.3447 |
| TTL/f < 1.2 | 1.1782 | 1.1846 | 1.1797 | 1.1788 | 1.1778 | 1.1700 | 1.1812 |
| |f1/f2| < 1.0 | 0.0479 | 0.0692 | 0.0680 | 0.0667 | 0.0495 | 0.0479 | 0.0680 |
| −2 < f1/f3 < 0 | −0.4153 | −0.4414 | −0.4364 | −0.4362 | −0.4168 | −0.4153 | −0.4366 |
| BFL/f < 0.3 | 0.1841 | 0.1873 | 0.1868 | 0.1849 | 0.1842 | −0.4153 | −0.4366 |
| D1/f < 0.1 | 0.0094 | 0.0096 | 0.0098 | 0.0096 | 0.0096 | 0.0095 | 0.0095 |
| D7/f < 0.1 | 0.0134 | 0.0133 | 0.0133 | 0.0146 | 0.0131 | 0.0130 | 0.0132 |
| D6-D1-D2 > 0.2 | 0.3899 | 0.4242 | 0.4129 | 0.3998 | 0.3975 | 0.4148 | 0.4137 |
| SA11/CT1 > 40 | 45.2159 | 45.5479 | 46.0238 | 46.2503 | 44.6061 | 45.5094 | 45.5735 |
| SA92/CT9 > 50 | 56.0871 | 56.9341 | 57.1802 | 56.1045 | 56.0599 | 57.1363 | 56.8489 |
| SAG11/CT1 > 0.70 | 0.8358 | 0.8431 | 0.8498 | 0.8520 | 0.8266 | 0.8424 | 0.8435 |
| 0.7 < L7S2/L8S1 < 1 | 0.7542 | 0.9917 | 0.9045 | 0.7919 | 0.7821 | 0.9882 | 0.9209 |

As set forth above, the optical imaging system according to one or more example embodiments of the present disclosure may implement a high-resolution image.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens, a second lens, a third lens, a fourth lens, a fifth lens, a sixth lens, a seventh lens, an eighth lens, and a ninth lens, arranged in order from an object side, wherein the first lens and the second lens each have positive refractive power, wherein 15<v7-v8<25 is satisfied, where v7 indicates an Abbe number of the seventh lens, and v8 indicates an Abbe number of the eighth lens, and wherein 0.5<L7S2/L8S1<1.2 is satisfied, where L7S2 indicates a radius of curvature of an image-side surface of the seventh lens, and L8S1 indicates a radius of curvature of an object-side surface of the eighth lens.

2. The optical imaging system of claim 1, wherein $25<v1-v3<45$ is satisfied, where v1 indicates an Abbe number of the first lens, and v3 indicates an Abbe number of the third lens.

3. The optical imaging system of claim 2, wherein at least one of $25<v1-v5<45$ and $15<v1-v6<25$ is satisfied, where v5 indicates an Abbe number of the fifth lens, and v6 indicates an Abbe number of the sixth lens.

4. The optical imaging system of claim 1, wherein $|f1/f2|<1.0$ is satisfied, where f1 indicates a focal length of the first lens, and f2 indicates a focal length of the second lens.

5. The optical imaging system of claim 4, wherein $0<f1/f<1.4$ and $5<f2/f<50$ are satisfied, where f indicates a total focal length of the optical imaging system.

6. The optical imaging system of claim 5, wherein $-5<f3/f<0$ is satisfied, where f3 indicates a focal length of the third lens.

7. The optical imaging system of claim 6, wherein $-2.0<f1/f3<0$ is satisfied.

8. The optical imaging system of claim 4, wherein at least one of $|f4/f|>50.0$, $-25<f5/f<0$, $|f6/f|>2.0$, and $f7/f<5.0$ is satisfied, where f4 indicates a focal length of the fourth lens, f5 indicates a focal length of the fifth lens, f6 indicates a focal length of the sixth lens, and f7 indicates a focal length of the seventh lens.

9. The optical imaging system of claim 4, wherein $D1/f<0.1$ is satisfied, where f indicates the total focal length of the optical imaging system, and D1 indicates a distance on an optical axis between an image-side surface of the first lens and an object-side surface of the second lens.

10. The optical imaging system of claim 1, wherein $D7/f<0.1$ is satisfied, where f indicates the total focal length of the optical imaging system, and D7 indicates a distance on an optical axis between the image-side surface of the seventh lens and the object-side surface of the eighth lens.

11. The optical imaging system of claim 1, wherein $TTL/f<1.2$ and $BFL/f<0.3$ are satisfied, where TTL indicates a distance on an optical axis from an object-side surface of the first lens to an imaging plane, and BFL indicates a distance on the optical axis from an image-side surface of the ninth lens to the imaging plane.

12. The optical imaging system of claim 1, wherein $D6-D1-D2>0.2$ mm is satisfied, where D1 indicates the distance on an optical axis between an image-side surface of the first lens and an object-side surface of the second lens, D2 indicates a distance on the optical axis between an image-side surface of the second lens and an object-side surface of the third lens, and D6 indicates a distance on the optical axis between an image-side surface of the sixth lens and an object-side surface of the seventh lens.

13. The optical imaging system of claim 1, wherein $SA11/CT1>40°/mm$ is satisfied, where SA11 indicates a sweep angle of the first lens at an end of an effective diameter of its object-side surface, and CT1 indicates a thickness on an optical axis of the first lens.

14. The optical imaging system of claim 1, wherein $SA92/CT9>50°/mm$ is satisfied, where SA92 indicates a sweep angle of the ninth lens at an end of an effective diameter of its image-side surface, and CT9 indicates a thickness on an optical axis of the ninth lens.

15. The optical imaging system of claim 1, wherein $SAG11/CT1>0.7$ is satisfied, where SAG11 indicates an SAG value of the first lens at the end of the effective diameter of its object-side surface, and CT1 indicates the thickness on an optical axis of the first lens.

16. The optical imaging system of claim 1, wherein the third lens has negative refractive power, and the fourth lens has positive or negative refractive power, and $|f3|<|f4|$ is satisfied, where f3 indicates the focal length of the third lens, and f4 indicates the focal length of the fourth lens.

17. The optical imaging system of claim 1, wherein the third lens has negative refractive power, the fourth lens has positive or negative refractive power, the fifth lens has negative refractive power, the sixth lens has positive refractive power, the seventh lens has positive refractive power, the eighth lens has positive or negative refractive power, and the ninth lens has negative refractive power.

18. An optical imaging system comprising:
a first lens, a second lens, a third lens, a fourth lens, a fifth lens, a sixth lens, a seventh lens, an eighth lens, and a ninth lens, arranged in order from an object side,
wherein the first lens and the second lens each have positive refractive power, the seventh lens has an Abbe number different from an Abbe number of the eighth lens, and $0.5<L7S2/L8S1<1.2$ is satisfied, where L7S2 indicates a radius of curvature of an image-side surface of the seventh lens, and L8S1 indicates a radius of curvature of an object-side surface of the eighth lens, and
wherein $|f3|<|f4|$ is satisfied, where f3 indicates a focal length of the third lens, and f4 indicates a focal length of the fourth lens.

19. The optical imaging system of claim 18, wherein the image-side surface of the seventh lens and the object-side surface of the eighth lens each have at least one inflection point in a region other than its paraxial region.

20. The optical imaging system of claim 19, wherein the third lens has negative refractive power, and $25<v1-v3<45$, and $15<v7-v8<25$ are satisfied, where v1 indicates an Abbe number of the first lens, v3 indicates an Abbe number of the third lens, v7 indicates an Abbe number of the seventh lens, and v8 indicates an Abbe number of the eighth lens, f3 indicates a focal length of the third lens.

21. An optical imaging system comprising:
a first lens, a second lens, a third lens, a fourth lens, a fifth lens, a sixth lens, a seventh lens, an eighth lens, and a ninth lens, arranged in order from an object side,
wherein the sixth lens and the seventh lens each have positive refractive power, convex object-side surfaces, and concave image-side surfaces, and
wherein $|f3|<|f4|$ is satisfied, where f3 indicates a focal length of the third lens, and f4 indicates a focal length of the fourth lens.

22. The optical imaging system of claim 21, wherein the fourth lens has a concave object-side surface and a convex image-side surface, and
wherein the eighth lens has a convex object-side surface and a concave image-side surface.

23. The optical imaging system of claim 21, wherein the first lens and the second lens each have positive refractive power, and
wherein the third lens, the fifth lens, and the ninth lens each have negative refractive power.

24. The optical imaging system of claim 21, wherein $15<v7-v8<25$ is satisfied, where v7 indicates an Abbe number of the seventh lens, and v8 indicates an Abbe number of the eighth lens.

25. The optical imaging system of claim 21, wherein $25<v1-v3<45$ is satisfied, where v1 indicates an Abbe number of the first lens, and v3 indicates an Abbe number of the third lens.

26. The optical imaging system of claim 21, wherein the seventh lens has an Abbe number different from an Abbe number of the eighth lens, and $0.5<L7S2/L8S1<1.2$ is satisfied, where L7S2 indicates a radius of curvature of an image-side surface of the seventh lens, and L8S1 indicates a radius of curvature of an object-side surface of the eighth lens.

27. The optical imaging system of claim 21, wherein one or more of $25<v1-v5<45$, and $15<v1-v6<25$ are satisfied, where v1 indicates an Abbe number of the first lens, v5 indicates an Abbe number of the fifth lens, and v6 indicates an Abbe number of the sixth lens.

\* \* \* \* \*